United States Patent [19]
Takahashi et al.

[11] Patent Number: 5,668,414
[45] Date of Patent: Sep. 16, 1997

[54] SPRING DRIVEN ELECTRICITY GENERATOR WITH A CONTROL CIRCUIT TO REGULATE THE RELEASE OF ENERGY IN THE SPRING

[75] Inventors: Osamu Takahashi; Yabe Hiroshi, both of Suwa; Akira Takakura, Chiba, all of Japan

[73] Assignee: Seiko Epson Corporation, Tokyo, Japan

[21] Appl. No.: 498,546

[22] Filed: Jul. 5, 1995

[30] Foreign Application Priority Data

Jul. 4, 1994 [JP] Japan .................. 6-152299

[51] Int. Cl.$^6$ .................. G04C 10/00; H02P 9/04
[52] U.S. Cl. .................. 290/1 E; 322/28; 322/29
[58] Field of Search .................. 290/1 E; 185/37, 185/38; 322/28, 29; 310/123, 76, 77

[56] References Cited

U.S. PATENT DOCUMENTS

| | | | |
|---|---|---|---|
| 3,675,113 | 7/1972 | Bader et al. | 322/28 |
| 3,800,212 | 3/1974 | Branco et al. | 322/28 |
| 4,169,992 | 10/1979 | Nash | 322/29 |
| 4,287,428 | 9/1981 | Smith | 290/1 E |
| 4,799,003 | 1/1989 | Tu et al. | 322/29 |
| 4,890,027 | 12/1989 | Bohner et al. | 310/328 |
| 5,517,469 | 5/1996 | Wiget | 368/140 |

FOREIGN PATENT DOCUMENTS

| | | |
|---|---|---|
| 59-135388 | 8/1984 | Japan . |
| 5-284690 | 10/1993 | Japan . |

*Primary Examiner*—Steven L. Stephan
*Assistant Examiner*—Christopher Cuneo
*Attorney, Agent, or Firm*—Stroock & Stroock & Lavan LLP

[57] ABSTRACT

An electricity generating device for generating electricity by using energy stored in a power spring. The electricity generating device includes a control circuit for monitoring a supply voltage supplied from a supply portion, a mechanical control portion, a voltage boosting portion, a power consuming portion and an electricity generating portion. The rotating speed of the electricity generating portion is controlled by the mechanical control portion, the voltage boosting portion and the power consuming portion. When the supply voltage is higher than a reference voltage, the rotating speed of the electricity generating portion is reduced and thus the unwinding speed of the power spring is decreased. Consequently, an amount of the energy of the power spring, which is matched with the power supplied from the supply portion, is consumed.

12 Claims, 15 Drawing Sheets

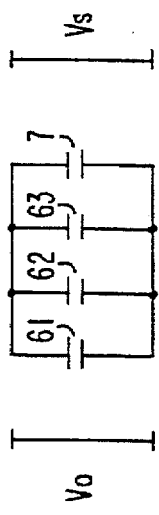
FIG.8(a) (y,x)=(0,0)
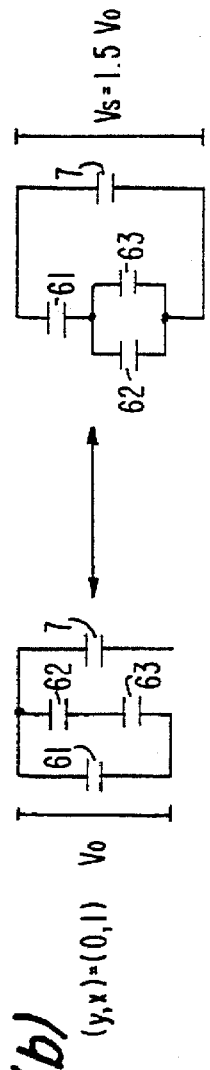
FIG.8(b) (y,x)=(0,1)
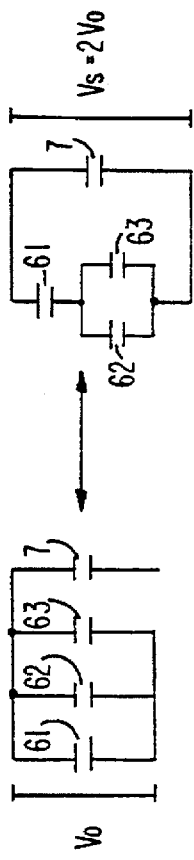
FIG.8(c) (y,x)=(1,0)
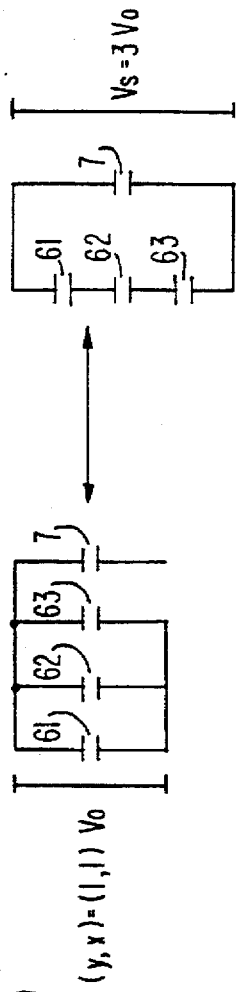
FIG.8(d) (y,x)=(1,1)

SPRING DRIVEN ELECTRICITY GENERATOR WITH A CONTROL CIRCUIT TO REGULATE THE RELEASE OF ENERGY IN THE SPRING

BACKGROUND OF THE INVENTION

The present invention generally relates to electricity generating devices, and in particular, to an electricity generating device that generates electricity by gradually extracting mechanical energy stored in a flat spiral spring such as a power spring and supplies the extracted energy to an external circuit and to a method for controlling such an electricity generating device.

One type of conventional electricity generating device is described in the Japanese Patent Public Disclosure No. 5-284690/1993 Official Gazette. This conventional device includes a power-spring battery that can transform the mechanical energy of a power spring into electric energy by means of a generator or dynamo and can transmit an electric current to an external electrical device. The electric current has the form of a pulsating current, which has a level varying within a predetermined amplitude or voltage and is obtained by using a three-terminal regulator and a capacitor. A second conventional electricity generating device, described in the Japanese Patent Public Disclosure No. 59-135388/1984 Official Gazette, is a clock which can measure an elapsed time with high accuracy by controlling the number of rotations of a generator or dynamo driven by a power spring, by means of an oscillator such as a crystal.

These conventional electricity generating devices, which generate electricity by using energy stored in power springs, may be effective in handling every day electric and electronic equipment in geographic regions that do not have power transmission networks. Further, in the aforementioned electronic generators, electric power can be obtained by periodically winding up the power springs thereby reducing the fear that the batteries may run down. Therefore, these conventional electronic generators can serve well as a backup power source during a disaster, such as an earthquake.

However, in a conventional power-spring battery, the smaller the power consumption of the electric equipment to be supplied with electric power becomes, the more ineffectual an electromagnetic brake is rendered. Thus, if the power consumption of such electric equipment is small, the generator or dynamo rotates at a high speed and the power spring is unwound quickly. Moreover, in the case where no electric equipment is connected to the conventional power-spring battery, the power spring is unwound rapidly. Consequently, the conventional power-spring battery can not function as a battery.

Furthermore, if, for example, the conventional power-spring battery is connected to an electric device such as a portable telephone which requires varying power consumption depending upon, for example, whether the telephone is in a reception wait state or in a busy state, the battery must generate electricity to maintain a state requiring the maximum working power, and the battery will supply more energy to the device than the device may require. The conventional power-spring battery, therefore, does not maximize the energy stored in the power spring. Moreover, most energy supplied from the power spring to the generator or dynamo is lost due to magnetic and mechanical causes such as air resistance. Consequently, when using the conventional power-spring battery, an electricity generating device having a sufficient lifetime can not be achieved.

Accordingly, an electricity generating device, which can effectively utilize energy stored in a power spring, can control electric power in accordance with the power consumption required by the external circuit, can automatically minimize the energy used to drive a generator or dynamo in accordance with the amount of electric power used by the external electric equipment and which has a wide range of an amount of electric power to be used and has a long lifetime, is desired.

SUMMARY OF THE INVENTION

An electricity generating portion includes a power spring for storing mechanical energy and is coupled to a dynamo. The spring releases mechanical energy causing the dynamo to rotate, producing mechanical energy into electrical energy. A supply portion supplies electric power from the electricity generating portion to an external circuit. A rotation control portion controls the rotating speed of the electricity generating portion according to a supply voltage from the supply portion. An electricity generating device in which the number of rotations, namely, the rotating speed of an electricity generating portion is controlled in such a manner as to make the supply voltage of the electricity generating device uniform. Thereby, in the case where the power consumption of electric equipment connected to the electricity generating device is low, the rotating speed of the electricity generating portion decreases and thus the unwinding speed of a power spring reduces. Consequently, the lifetime of the electricity generating device, during which electricity can be generated, is increased and moreover, the electricity generating device can make good use of the energy stored in the power spring. In contrast, in the case where the power consumption of an electric equipment connected to the electricity generating device is high, the rotating speed of the electricity generating portion is increased in such a manner that the supply voltage becomes uniform or steady. Thereby, desired electric power can be supplied. For the purpose of controlling the rotating speed of the electricity generating portion, the electricity generating device of the present invention is adapted to be able to employ two methods, namely, a mechanical control method and a method of controlling an output current of the electricity generating portion.

An electricity generating device employing a mechanical control method is characterized by comprising an electricity generating portion for transforming mechanical energy into electrical energy. The rotation control portion, utilizing the mechanical method, may be provided with a comparison portion for comparing the supply voltage with a reference voltage, a brake member placed in such a manner as to be able to come in contact with at least a part of a rotation member of the electricity generating portion, and a driving portion for pressing the brake member against the rotation member when the supply voltage becomes higher than the reference voltage. When the rotating speed of the electricity generating portion is mechanically controlled, the electric power is hardly consumed by the electric equipment which is connected to the generator and is operative to use the electric power. Thus, when the supply voltage becomes higher than the reference voltage, the generator comes to be able to completely stop the electricity generating portion. Therefore, the energy stored in the power spring can be substantially completely conserved, for instance, when there is no power consumption in the electric equipment which is connected to the generator and is operative to use the electric power.

Further, for example, a piezoelectric element or transducer such as a bimorphous piezoelectric transducer can be used in the driving portion. Furthermore, a supply voltage at which a rotating speed control operation is started or the electricity generating portion is stopped, can be easily set, altered and regulated by adjusting the distance between this piezoelectric transducer and the electricity generating portion. The brake member can be controlled by directly or indirectly applying a supply voltage to the piezoelectric transducer. Moreover, a mechanical control method of the non-contact type can be used in the generator.

Further, in the case where the power load on the electric equipment, which is connected to the generator and is operative to use the electric power, is small, the power load on the electricity generating portion can be controlled by a rotation control portion for controlling an output current of the electricity generating portion according to the supply voltage. Even when the electric power consumed by the electric equipment, which is connected to the generator and is operative to use the electric power, is small, the unwinding speed of the power spring can be reduced by controlling the power load on the electricity generating portion. Thus, the energy stored in the power spring can be effectively utilized.

To control an output current of the electricity generating portion, the rotation control portion can employ a voltage boosting portion which has at least a system boosting capacity which can be connected in parallel with an output terminal of the electricity generating portion and can boost an output voltage of the electricity generating portion and supply the boosted voltage to the supply portion. Further, the rotation control portion performs at least one of a first control operation, in which a boost or increase in the voltage boosted by the voltage boosting portion is decreased when the supply voltage becomes lower than the reference voltage, and a second control operation in which the boost in the voltage boosted by the voltage boosting portion is increased when the supply voltage becomes higher than the reference voltage. In the case of an electricity generating device of the type that has no necessity of winding up the power spring when the generator is used and that has to supply merely a fixed amount of electric power, the rotation control portion has only to perform the control operation of decreasing the boost in the voltage boosted by the voltage boosting portion.

In the case of using such a voltage boosting portion, the boosting capacity can be connected in parallel to the electricity generating portion when the supply voltage is high, resulting in a control operation of increasing an output current of the electricity generating portion and lowering an output voltage thereof. Thus the torque required for rotating the generator or dynamo is increased, so that the unwinding speed of the power spring is lowered. Further, the voltage charged across a capacitor having the boosting capacity is boosted through the voltage boosting portion to a predetermined supply voltage. Therefore, a part of the energy stored in the power spring, which is wasted in the conventional generator, can be effectively utilized. Moreover, the rotating speed of the electricity generating portion can be controlled.

Alternatively, a power consuming portion placed in parallel with an output terminal of the electricity generating portion may be employed in the rotation control portion. Further, the rotation control portion may be adapted to perform at least one of a first control operation, in which an amount of electric power consumed by the power consuming portion is decreased when the supply voltage becomes lower than the reference voltage, and a second control operation in which the amount of the electric power consumed by the power consuming portion is increased when the supply voltage becomes higher than the reference voltage. The rotating speed of the electricity generating portion can be directly controlled by directly consuming the electric power supplied from the electricity generating portion. Further, a waste of the electric power, the quality of which is improved by performing a processing such as a rectification, can be prevented.

The electricity generating portion produces an a.c. output. In the case where a rectification portion for performing a half-wave rectification is provided therein, the electric power to be consumed for performing a control operation and the supplied power can be used appropriately by providing a one-way element for letting an a.c. output, the polarity of which is opposite to that of the a.c. output of the rectification portion, flow therethrough to the power consuming portion. Such a power consuming portion can be realized by a circuit capable of changing the value of a variable resistance or a circuit capable of changing a duty factor by performing a pulse-duration control operation. Therefore, the rotating speed of the electricity generating portion can be achieved with high accuracy by using a control circuit having a simple configuration.

The rotation control portion for mechanically controlling the rotating speed of the electricity generating portion, and the rotation control portion for controlling an output current of the electricity generating portion, namely, the rotation control portion for controlling the boost in the voltage and the rotation control portion for controlling a self-consumption amount of electric power can be combined with each other. In the case of controlling the boost in the voltage and the self-consumption amount, respectively, the range of uses of mechanical energy stored in the power spring can be expanded by controlling the boost in the voltage, and moreover, the effective use of the mechanical energy can be achieved by controlling the self-consumption amount. The fine-adjustment of the rotating speed with respect to the supply voltage can be performed by controlling the self-consumption amount. On the other hand, the wide-range control thereof can be performed by controlling the boost in the voltage. Moreover, even a high rotating speed can be braked down harshly by altering steps of the operation of controlling the self-consumption amount. Furthermore, if operations of controlling the boost in the voltage and mechanically controlling the rotating speed are performed, the expansion of the range of use of the mechanical energy and the conservation of the mechanical energy can be achieved. Additionally, the operation of controlling the self-consumption amount may be combined with the operation of mechanically controlling the rotating speed. Thereby, the effective use and conservation of the mechanical energy can be attained by using a relatively simple circuit configuration.

In the case of employing both of the mechanical control process of mechanically controlling the rotating speed of the electricity generating portion according to the supply voltage supplied from the supply portion and the current control process of controlling an output current of the electricity generating portion according to the supply voltage, it is preferable that the current control process takes priority over the mechanical control process. This is because the fine-adjustment of rotating speed can be easily achieved by controlling the electric current and moreover, a waste of mechanical energy stored in the power spring can be further reduced by stopping the electricity generating portion through the mechanical control.

Further, in the case of employing both of the voltage boosting control method or process of controlling a boost in the voltage and the power consumption control process of controlling the power consumption, it is preferable that the power consumption control process takes priority over the voltage boosting control method or process. This is because a waste of the energy stored in the power spring can be restrained by controlling the boost in the voltage and moreover, the fine-adjustment of the rotating speed can be achieved by controlling the power consumption.

Accordingly, an object of the present invention is to provide an electricity generating device which can effectively utilize energy stored in a power spring.

Further, another object of the present invention is to provide an electricity generating device that can automatically control electric power, which should be supplied to the external circuit, according to the power consumption of the external circuit, which uses the electric power, and can automatically minimize energy, which is used to drive a generator or dynamo, according to an amount of electric power used by an external circuit to which the electric power is supplied.

Moreover, still another object of the present invention is to provide an electricity generating device which has a wide range of an amount of electric power to be used and also has a long lifetime according to such an amount of the electric power.

Still other objects and advantages of the invention will in part be obvious and will in part be apparent from the specification and drawings.

The invention accordingly comprises the several steps and the relation of one or more of such steps with respect to each of the others, and the article possessing the features, properties and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 8(a) to 8(d) are schematic diagrams illustrating the changing electrical configurations of the voltage boosting portion of FIG. 7 in accordance with the operation of the invention;

DETAILED DESCRIPTION OF THE PREFERRED EMBODIMENTS

Figure 1:
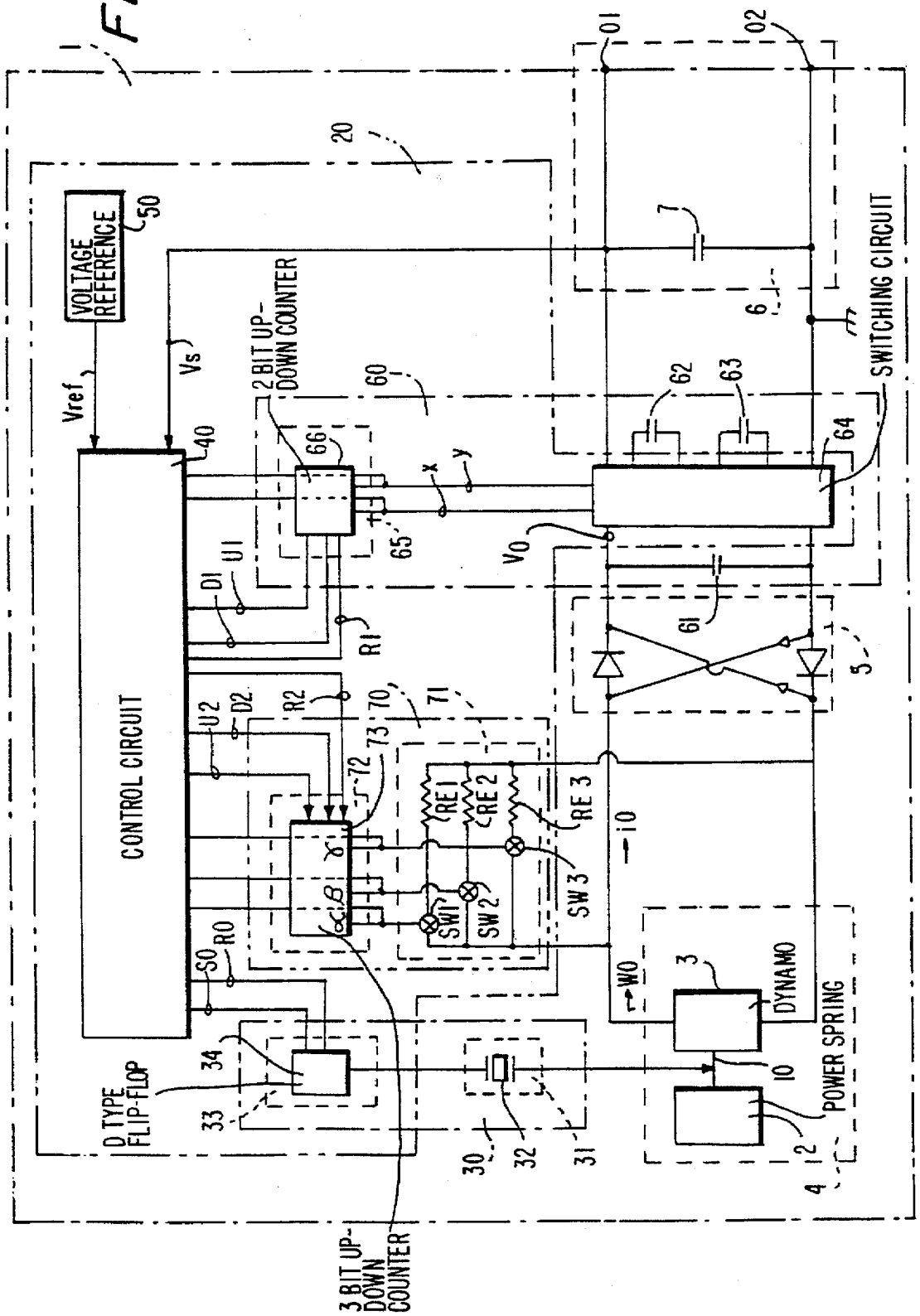
FIG. 1 is a block diagram of an electricity generating device in accordance with a first embodiment of the present invention.

Reference is first made to FIG. 1, in which a block diagram of an electricity generating device, generally indicated as 1, constructed in accordance with a first embodiment of the present invention is provided. Electricity generating device 1 includes an electricity generating portion 4 and a rectification portion 5 for rectifying a signal outputted from electricity generating portion 4. A voltage boosting portion connects rectification portion 5 to a supply portion 6. A rotation control portion 30 is coupled to electricity generating portion 4 for mechanically controlling the rotation speed of a dynamo 3 within electricity generating portion 4. Voltage boosting portion 60 boosts an output voltage Vo of the electricity generating portion 4. A power consuming portion 70 coupled to electricity generating portion 4 consumes a part of output electric power Wo of the electricity generating portion 4. A control circuit 40 is coupled between reference voltage generating circuit 50, power consuming portion 70, voltage boosting portion 60, rotation control portion 30 and a supply portion 6.

Electricity generating portion 4 includes a power spring 2 and a dynamo 3 connected to power spring 2 through a train of wheels 10. Electric power outputted from electricity generating portion 4 is inputted to rectification portion 5 and full-wave rectified. The rectified signal is outputted from rectification portion 5 and inputted to supply portion 6 through voltage boosting portion 60. Supply portion 6 includes an output capacitor 7 which can act as a buffer. Each terminal of output capacitor 7 is connected to output terminals O1 and O2, respectively.

Electricity generating device 1 controls a supply voltage Vs which corresponds to the electric power supplied from supply portion 6 in such a manner as to be within a predetermined range. Electricity generating device 1 includes a control integrated circuit 20 (IC 20). Various circuits may be mounted on IC 20 and several devices may be driven by IC 20.

Figure 2:
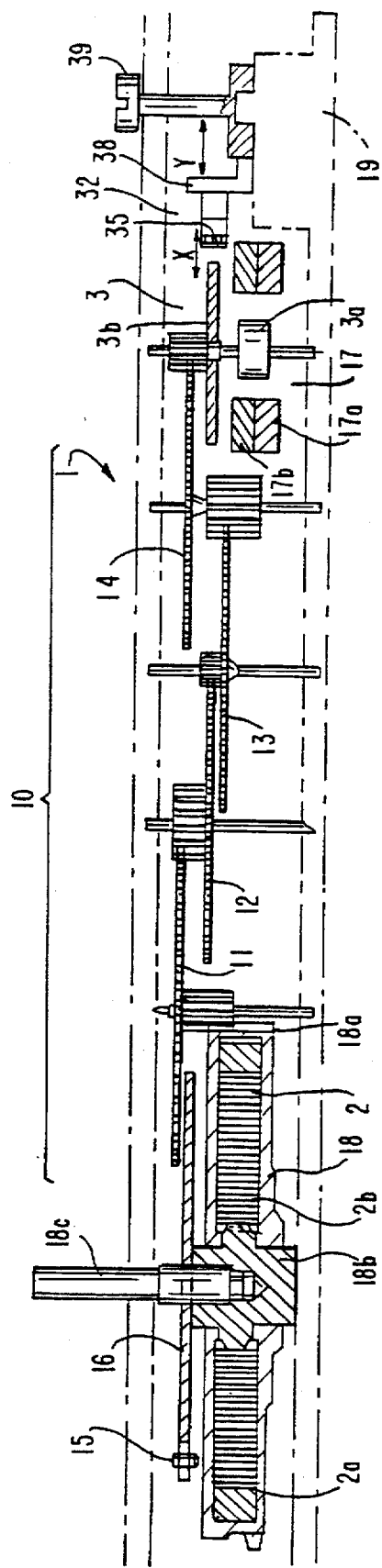
FIG. 2 is an elevational view of an electricity generating portion of the electricity generating device in accordance with the first embodiment of the present invention.

Reference is now also made to FIG. 2 wherein rotation control portion 30 includes a driving portion 31 and a drive circuit 33. Rotation control portion 30 includes a brake member 35 capable of braking down a rotation member, such as a fly-wheel 3b, of dynamo 3. Driving portion 31 drives the brake member 35. Driving portion 31 includes a piezoelectric transducer 32, which for example, may be a bimorphous piezoelectric transducer. Piezoelectric transducer 32 is controlled by drive control circuit 33. Drive control circuit 33 includes a D-type flip-flop 34.

Control circuit 40 monitors the supply voltage Vs and compares this voltage to a reference voltage Vref generated by reference voltage generating circuit 50. Control circuit 40 outputs a setting signal S0 and a resetting signal R0 to drive control circuit 33, thereby controlling rotation control portion 30.

Voltage boosting portion 60 includes a switching circuit 64 and a voltage boosting control circuit 65 coupled to switching circuit 64. Voltage boosting portion 60 receives the rectified signal from rectification portion 5 and can boost the rectified voltage and supply the boosted voltage to output capacitor 7. Voltage boosting portion 60 also includes three voltage boosting capacitors 61, 62 and 63 coupled to switching circuit 64 that can be electrically configured to vary an outputted voltage in multiples of 1, 1.5, 2 and 3 times the original input voltage by operation of switching circuit 64. The electrical configuration of voltage-boosting capacitors 61, 62, 63 is varied by switching circuit 64 to obtain a predetermined boosted output voltage. Switching circuit 64 is controlled by voltage boosting control circuit 65 which itself includes a 2-bit up-down counter 66. Control circuit 40 monitors the supply voltage Vs from supply portion 7, compares Vs to Vref and in response thereto controls and outputs an up-signal U1, a down-signal D1 and a resetting signal R1 to voltage boosting control circuit 65.

Power consuming portion 70 includes a variable resistance circuit 71 and a resistance value control circuit 72 which is connected to and controls resistance circuit 71. Power consuming portion 70 is also connected in parallel to electricity generating portion 4. Variable resistance circuit 71 includes three parallelly connected resistors RE1, RE2 and RE3, each having a different resistance value as further described below. Variable resistance circuit 71 also includes three switches SW1, SW2 and SW3, each being connected in series with a corresponding resistor RE1, RE2 and RE3. Resistance value control circuit 72 is constituted by a 3-bit up-down counter 73 coupled to each switch SW1, SW2, SW3.

Control circuit 40 also controls power consuming portion 70, voltage boosting portion 60 and mechanical rotation control portion 30. Control circuit 40 also monitors output bits (γ, β, α) of up-down counter 73 of power consuming portion 70 and output bits (y, x) of up-down counter 66 of voltage boosting portion 60. Control circuit 40, in response to the supply voltage Vs which is being monitored and compared to Vref, also controls resistance value control circuit 72 and outputs thereto an up-signal U2, a down-signal D2 and a resetting signal R2.

Figure 3:
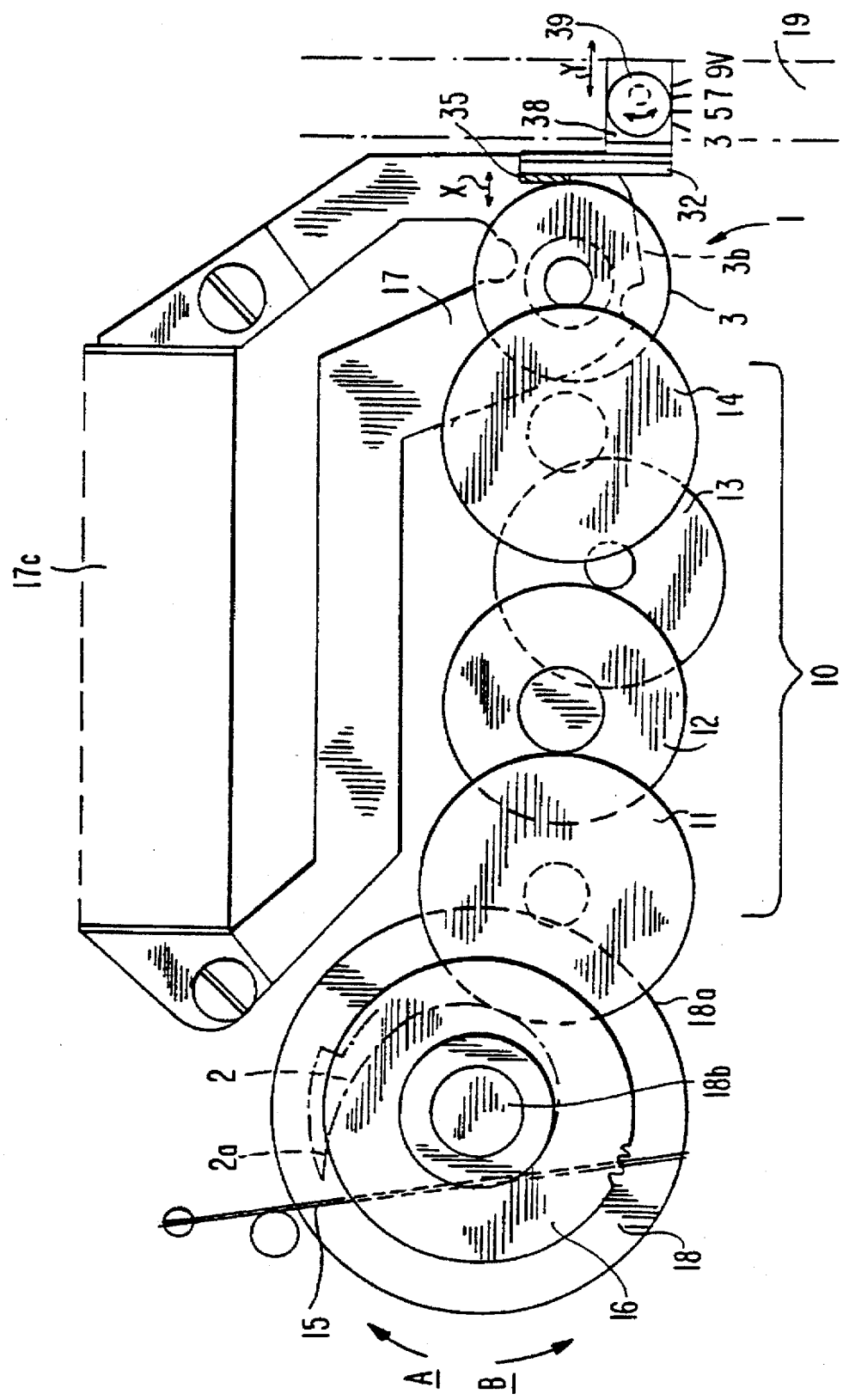
FIG. 3 is a plan view of the electricity generating portion of FIG. 2.

Reference is now made to FIGS. 2 and 3 which more particularly illustrate electricity generating portion 4. Electricity generating portion 4 includes a housing 19 which houses train of wheels 10 and dynamo 3. Train of wheels, generally indicated as 10, includes a main wheel (or barrel drum) 18 which houses power spring 2. A center wheel (or second wheel) 11 meshes with main wheel 18. A third wheel 12 meshes with center wheel 11 which in turn meshes with a fourth wheel 13. A fifth wheel 14 meshes with fourth wheel 13. Dynamo 3 meshes with fourth wheel 13, as further described below. All of the wheels are rotatably mounted in housing 19. The train of wheels 10 and dynamo 3 are oriented in a flat manner in order to reduce the thickness of the electricity generating portion. A ratchet wheel or gear 16 is coupled to the main wheel 18. A click 15 engages ratchet gear 16 to prevent main wheel 18 from rotating in a direction of arrow A in FIG. 3. Power spring 2 includes an outer end 2a which is fixed to a main gear (or barrel gear) 18a by welding or the like, and an inner end 2b which is fixed to a main core (or barrel core) 18b with a securing pin or the like. Click 15 prevents the ratchet gear 16 from rotating counterclockwise (in the direction of arrow A in FIG. 3) as viewed from the top of wheel train 10, but does not prevent rachet gear 16 from rotating clockwise (in the direction of arrow B of FIG. 3). Because outer end 2a and the inner end 2b of power spring 2 are fixed to main gear 18a and main core 18b of main wheel 18, respectively, power spring 2 can be wound up while dynamo 3 is rotating. Therefore, while electricity is being generated, energy can be stored in power spring 2 by periodically winding up power spring 2 by use of a shaft 18c connected to main core 18b. Energy can also be stored in power spring 2 when the output power of electricity generating device 1 decreases. Spring 2 rotates main wheel 18 which causes rotation of each wheel in train of wheels 10.

Dynamo 3 includes a rotor 3a and a fly-wheel 3b for stabilizing the rotation of rotor 3a. Fly wheel 3b meshes with fourth wheel 13, rotating dynamo 3 with rotation of main wheel 18. A stator 17 is connected to a coil block 17c formed by winding coils around a magnetic core. Electricity is generated by rotating rotor 3a and fly-wheel 3b relative to stator 17. By way of example, stator 17 is formed as two-layer structures 17a and 17b, using PC PERMALLOY®, for the magnetic core of stator 17 in order to reduce losses due to eddy currents. A hysteresis loss is decreased by reducing coercive force.

Rotation control portion 30 includes a piezoelectric transducer 32 attached to housing 19 through a support 38. A brake pad 35 is mounted on a first end of piezoelectric transducer 32. When a voltage is supplied to piezoelectric transducer 32, the first end thereof extends towards fly-wheel 3b of dynamo 3. The rotating speed of dynamo 3 can be reduced by pressing brake pad 35 against fly-wheel 3b. In this way, the rotation of dynamo 3 can also be stopped. Support 38, to which piezoelectric transducer 35 is attached, is fixed to housing 19 with an attaching screw 39 which rotates around an eccentric axis. Therefore, when turning attaching screw 39, support 38 moves towards housing 19 in the direction indicated by the X arrow. As a result, a gap, indicated by arrow X between piezoelectric transducer 32 and fly-wheel 3b, is varied and the moment at which the brake pad 35 contacts flywheel 3b can be regulated. The approximate value of the supply voltage corresponding to a moment at which dynamo 3 is stopped by the brake pad 35 when the attaching screw 39 is pivoted with respect to the housing 19, is indicated in FIG. 3, depicting illustrative increment notations of 3, 5, 7 and 9 volts. Therefore, a user can change a moment at which the rotation control portion 30 starts controlling and a moment at which the dynamo 3 is stopped.

Figure 4:
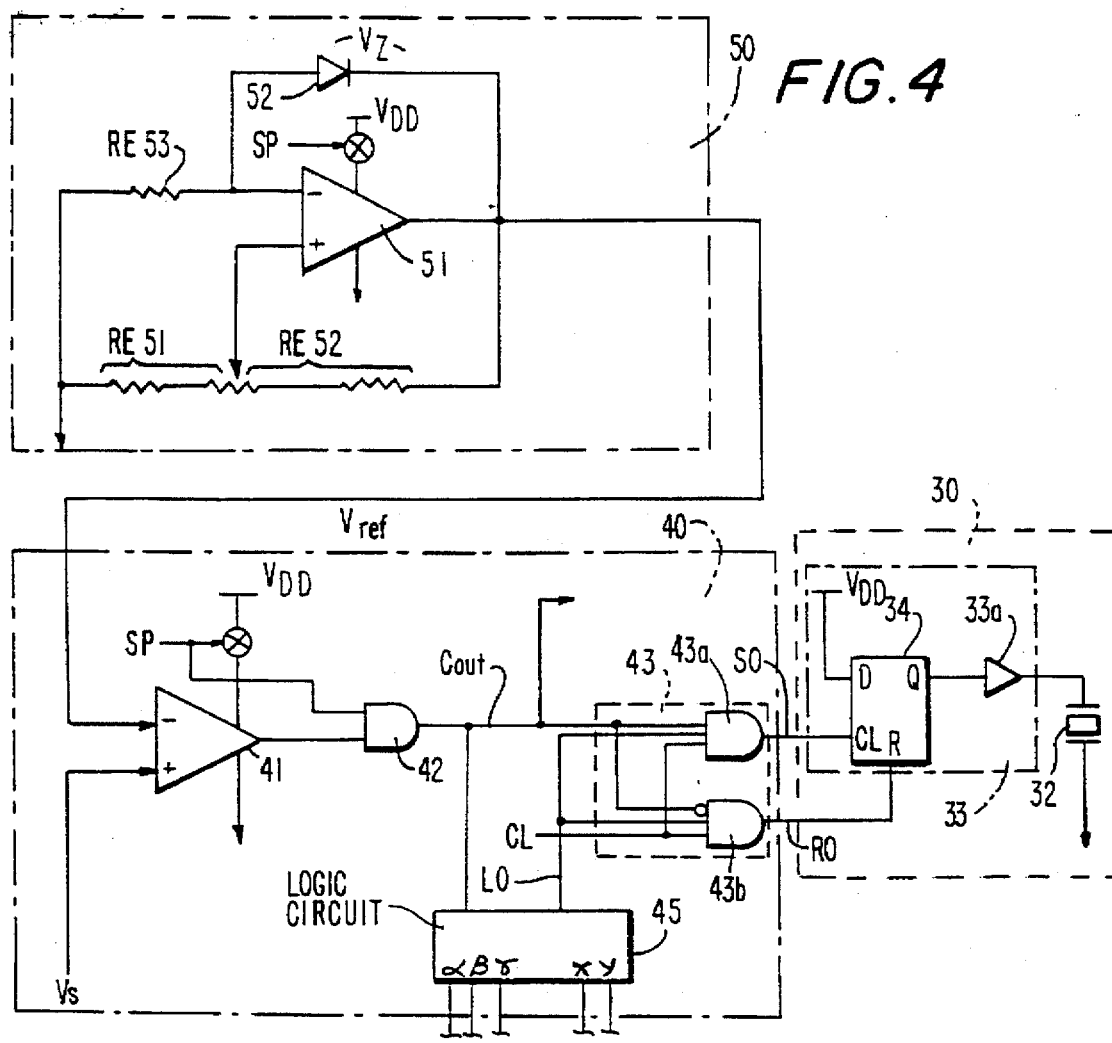
FIG. 4 is a schematic diagram of a mechanical rotation control portion of the electricity generating device of FIG. 1.

Reference is now made to FIG. 4, which more particularly illustrates rotation control portion 30, which mechanically controls the rotation of dynamo 3, control circuit 40, which controls rotation control circuit 30, and reference voltage generating circuit 50. Reference voltage generating circuit 50 includes an operational amplifier 51 and a zener diode 52. Zener diode 52, having a zener voltage Vz, is connected in parallel to an output terminal and an inverting input terminal of operational amplifier 51. Resistors RE51 and RE52 are connected to each other in series and are also connected in parallel at the output terminal and the non-inverting input terminal of operational amplifier 51. A resistor RE53 is connected to the inverting terminal of operational amplifier 51 as shown in FIG. 4. In this configuration, operational amplifier 51 outputs a reference voltage Vref in accordance with the following equation:

$$Vref=(1+RE51/RE52) Vz \quad (1)$$

Moreover, the duration of time during which a source voltage Vdd is supplied to operational amplifier 51 by using a sampling signal SP (generated at control circuit 40) is limited so as to prevent a waste of electric power. The output of operational amplifier 51 is supplied to the control circuit 40 as reference voltage Vref.

As further shown in FIG. 4, control circuit 40 includes a comparator 41 and an AND-gate 42, a selector 43 and a logic circuit 45. An inverting input terminal of comparator 41 receives reference voltage Vref as an input and a non-inverting input terminal of comparator 41 is connected to supply voltage Vs from supply portion 6. The output of comparator 41 and a sampling signal SP are provided as inputs to AND-gate 42. The output of AND-gate 42 (Cout) is provided as an input to logic circuit 45 and selector 43. Logic circuit 45 of control circuit 40 monitors output signals (α, β, γ) of power consuming portion 70 and output signals (x, y) of voltage boosting portion 60 when power consuming portion 70 and voltage boosting portion 60 are operating and when these latter two portions 60 and 70 are not operational. Logic circuit 45 also outputs signal L0 as an input signal to selector 43.

Selector 43 includes two AND-gates 43a and 43b. AND-gate 43a receives, as inputs, the output of AND-gate 42, the output signal (signal L0) of logic circuit 45 and a clock signal CL. AND-gate 43b receives, as inputs, the logic inverse of the output of AND-gate 42, the output signal (signal L0) of logic circuit 45 and clock signal CL.

Furthermore, logic circuit 45 also monitors the output (Cout) of AND-gate 42. If the Cout signal does not change from a logic high to a logic low, even if voltage boosting portion 60 and power consuming portion 70 are operating, logic circuit 45 will output the control signal LO. Output signal LO causes the driving of piezoelectric transducer 32 and, as discussed below, stops the generation of electricity and the waste of energy of power spring 2.

Selector 43 operates in response to clock signal CL. In response to clock signal CL, selector 43 of control circuit 40 outputs a setting signal S0 when the supply voltage Vs is higher than the reference voltage Vref. When supply voltage Vs is lower than reference voltage Vref, selector 43 of control circuit 40 outputs a resetting signal R0. Thus, as seen below, the mechanical rotation control portion 30 is operated when the supply voltage Vs is not lowered even under the control of the voltage boosting portion 60 and the power consuming portion 70.

Rotation control portion 30 includes drive control circuit 33 and piezoelectric transducer 32. Drive control circuit 33 includes D-type flip-flop 34 and a buffer 33a. The data input terminal of flip-flop 34 is connected to the source voltage Vdd. Further, setting signal S0, which is an output of selector 43, is inputted to the clock input terminal of flip-flop 34. Resetting signal R0, the second output of selector 43, is inputted to the resetting-signal input terminal of flip-flop 34. The Q output of flip-flop 34 is connected to the input of buffer 33a, and the output of buffer 33a is connected to the input of piezoelectric transducer 32, which itself serves as a driving portion. Accordingly, when supply voltage Vs is higher than reference voltage Vref, a voltage is supplied from drive control circuit 33 to piezoelectric transducer 32 in response to setting signal S0. Therefore, and as shown in FIG. 2, the end of transducer 32 to which brake pad 35 is attached is pressed against fly-wheel 3b of dynamo 3 thereby reducing the rotating speed of dynamo 3. This stops the generation of electricity and a waste of the energy of power spring 2 can be prevented. When the supply voltage Vs is lower than reference voltage Vref, flip-flop 34 is reset in response to resetting signal R0. Thus no voltage is supplied from drive control circuit 33 to piezoelectric transducer 32. Consequently, electricity generating portion 4 is rotated by the energy of power spring 2 and generates electricity.

For example, if no external circuit is connected to output terminals O1 and O2 of supply portion 6, output capacitor 7 is charged by the power from electricity generating portion 4 and the supply voltage Vs exceeds the reference voltage Vref. The rotating speed of electricity generating portion 4 is then decreased through control circuit 40 and rotation control portion 30. The rotation of electricity generating portion 4 is then stopped and power spring 2 is prevented from unwinding. When the voltage developed across output capacitor 7 decreases due to the internal energy consumption of control circuit 40 and rotation control portion 30, supply voltage Vs will become lower than reference voltage Vref, and the control operation of rotation control portion 30 will cause electricity generating portion 4 to once again begin generating electricity. The voltage developed across output capacitor 7 will then increase.

Figure 5:
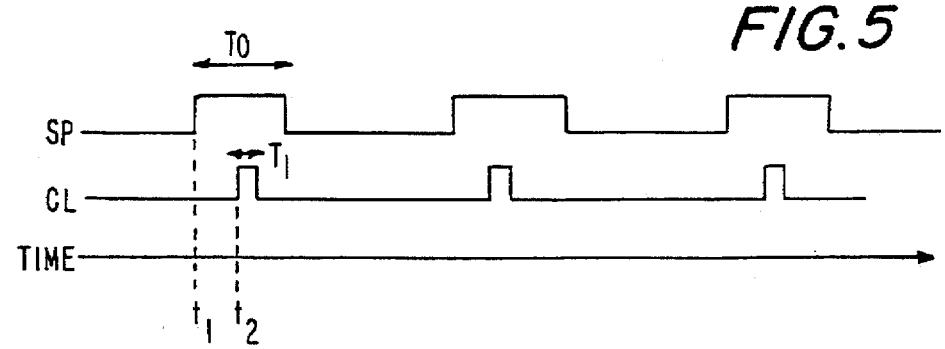
FIG. 5 is a timing chart describing the timing relation between a sampling signal and a clock signal in accordance with the invention.

In electricity generating device 1, the electric power consumed by the amplifiers or the like is reduced by using sampling signal SP so that the power consumed by reference voltage generating circuit 50 and control circuit 40 is decreased. As shown in FIG. 5, sampling signal SP is a pulse signal, the period thereof equal to that of clock signal CL. The pulse duration or width of sampling signal SP is set as being larger than that of clock signal CL. Moreover, the leading edge of the sampling signal SP (at rise moment t1) is earlier in time than the occurrence of a leading edge of clock signal CL (at rise moment t2). Thus, for example, when selector 43 is operational in response to the clock signal CL, stable signals are inputted to selector 43. Therefore, the power consumption can be further reduced while ensuring a stable circuit operating environment.

Figure 6A:
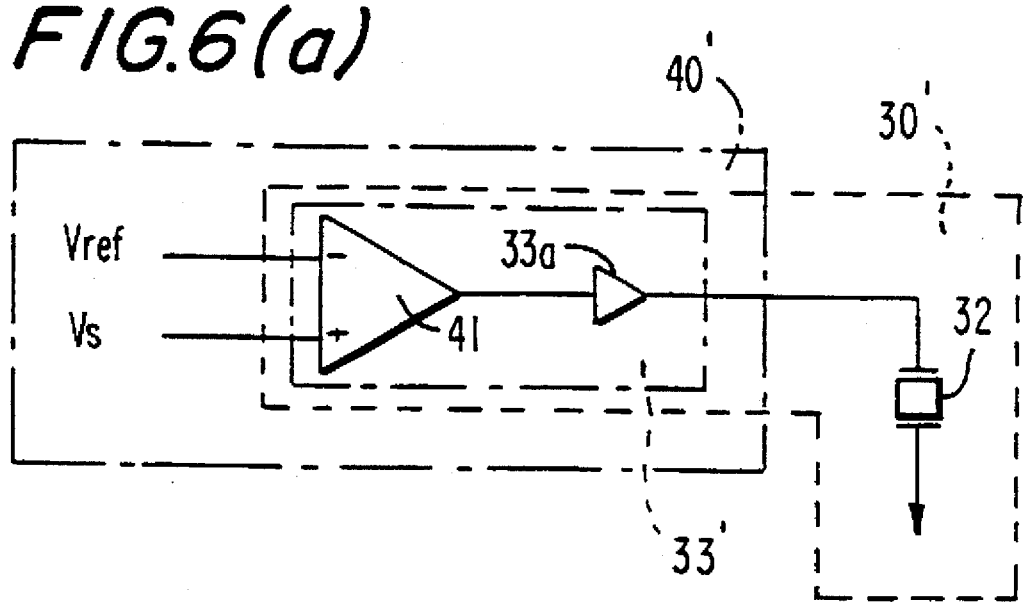
FIG. 6(a) is a schematic diagram of a rotation control portion constructed in accordance with a second embodiment of the present invention.
Figure 6B:
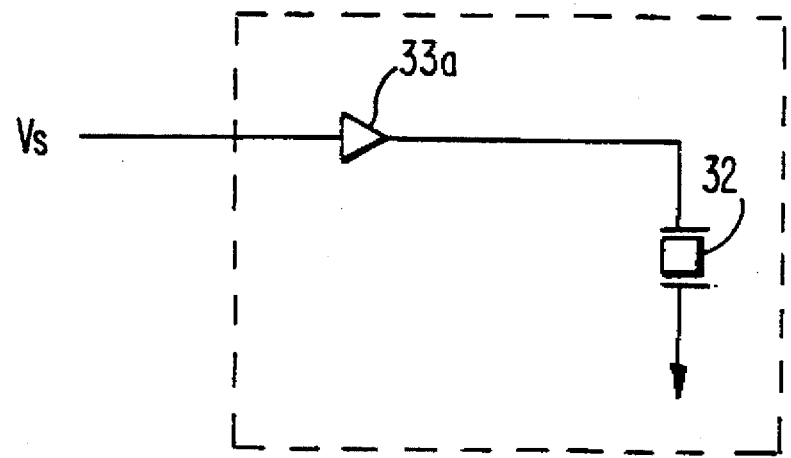
FIG. 6(b) is a schematic diagram of a rotation control portion constructed in accordance with another embodiment of the invention.

Reference is now made to FIGS. 6(a) and 6(b) which illustrate schematic diagrams of a control circuit and a rotation control portion in accordance with additional embodiments of the present invention. Like numerals in the second embodiment are used to indicate like structures of the first embodiment. As illustrated in FIG. 6(a), a control circuit 40' serves as a drive control circuit 33'. Drive control circuit 33' includes comparator 41 and buffer 33a. A rotation control portion 30' also includes the aforementioned drive control circuit 33' and piezoelectric transducer 32. The output of comparator 41 is connected to the input of buffer 33a. The output of buffer 33a is connected to the input of piezoelectric transducer 32. Transducer 32 serves as a drive portion. As illustrated in FIG. 6(b), the supply voltage Vs may be directly connected to or may be connected through buffer 33a to piezoelectric transducer 32 serving as a drive portion.

When the supply voltage Vs rises, piezoelectric transducer 32 operates. Therefore, as in the aforementioned first embodiment, the rotation of electricity generating portion 4 can be reduced by braking. Thus, it can be seen that the electricity generating device construction is not limited to the construction disclosed in the first embodiment. Moreover, the electricity generating device has only to have the functions of increasing a braking amount, namely, a reduction in the rotating speed when the supply voltage rises, and of decreasing the braking amount. When the supply voltage becomes too high, namely, when the electric power consumed by the external equipment, which is connected to the electricity generating device and uses the power, is low, the rotation of the electricity generating portion can be mechanically controlled and stopped, and the energy stored in the power spring can be almost completely conserved.

It is also to be understood that the rotating speed of electricity generating portion may be mechanically controlled by using a brake of a non-contact type, which utilizes magnetic force, instead of a brake of the contact type.

Figure 7:
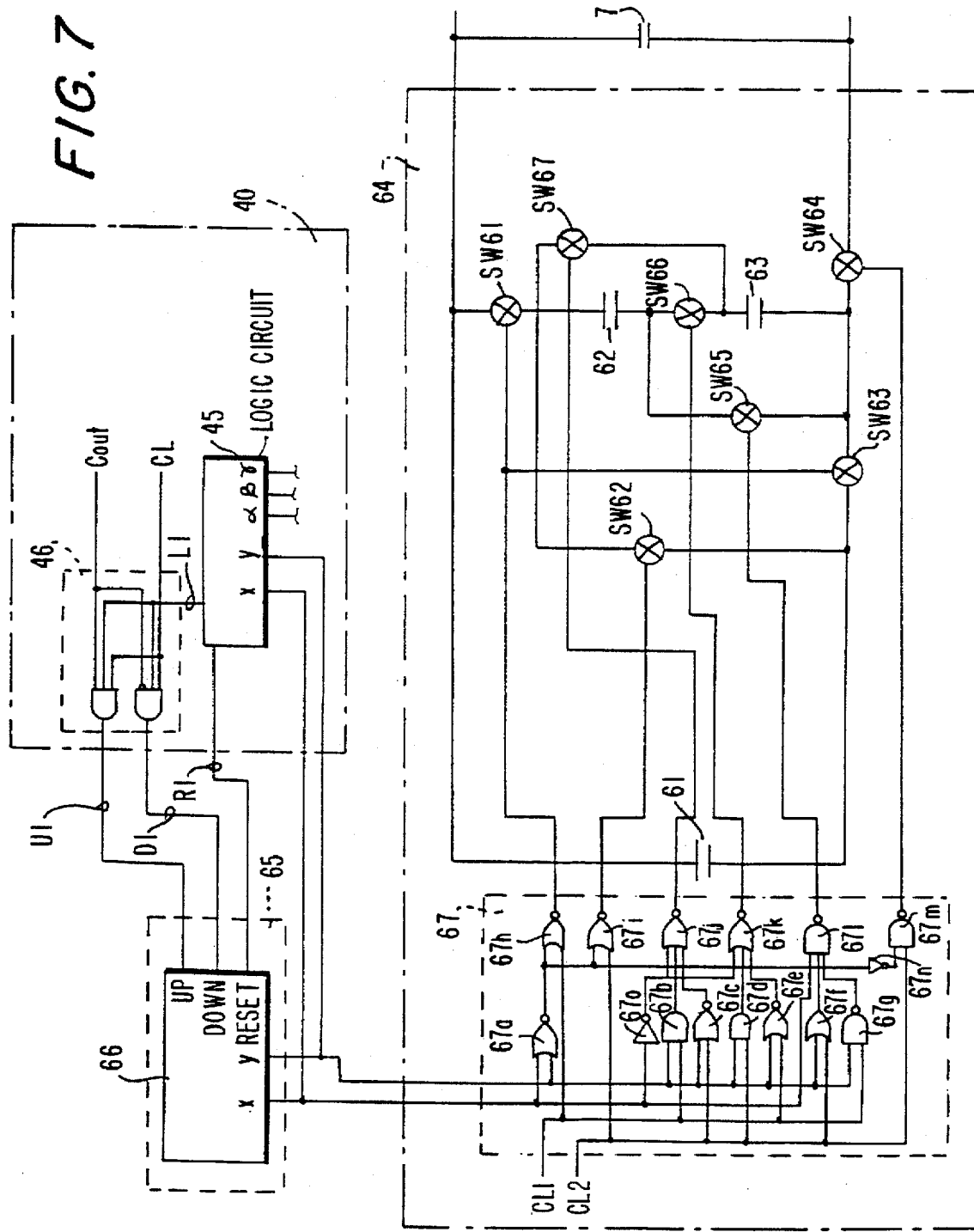
FIG. 7 is a schematic diagram of a voltage boosting portion of the electricity generating device constructed in accordance with the first embodiment of the present invention.
Figure 9A:
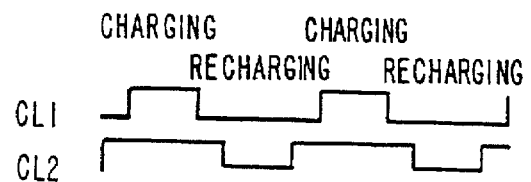
FIGS. 9(a)–9(d) are timing charts illustrating the operations of switches of the voltage boosting portion of FIG. 7.
Figure 9B:
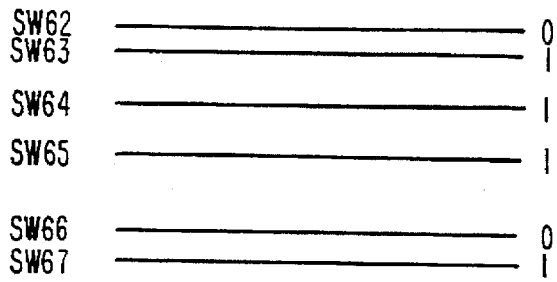
Figure 9C:
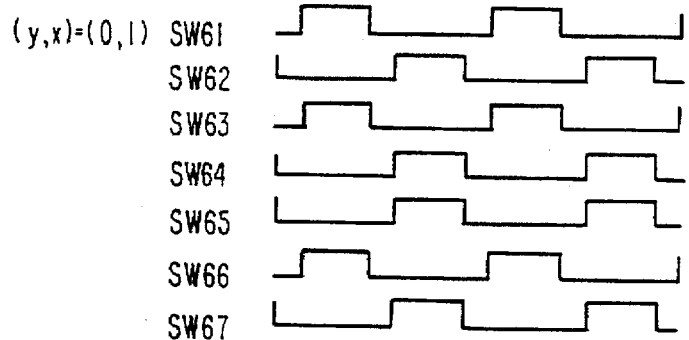
Figure 9D:
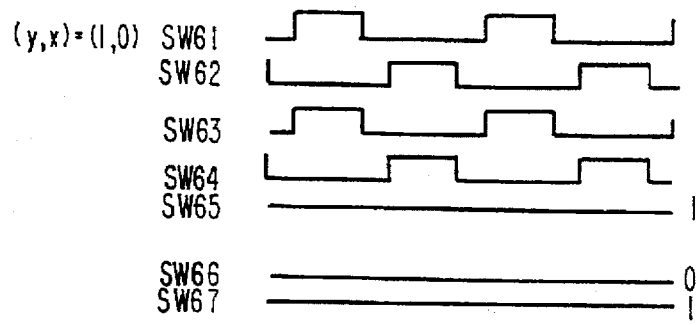

Reference is now made to FIG. 7, which more particularly illustrates components of voltage boosting portion 60 of electricity generating device 1 in accordance with the first embodiment of the invention. Voltage boosting portion 60 includes three voltage boosting capacitors 61, 62 and 63, switching circuit 64 and a switching control circuit 67. The configuration of capacitors 61, 62, 63 is varied by switching circuit 64. Switching circuit 64 includes seven switches SW61 to SW67 and switching control circuit 67. Switching control circuit 67 controls switches SW61 to SW67. Clock signals CL1 and CL2 are provided as inputs to switching control circuit 67. Clock signals CL1 and CL2 control the step of charging voltage boosting capacitors 61, 62 and 63 by use of the electric power supplied from electricity generating portion 4 and the step of recharging output capacitor 7 by changing the configuration of the voltage boosting capacitors 61, 62 and 63.

Switching control circuit 67 includes a NOR-gate 67a which receives, as inputs, output signals (x, y) from up-down counter 66, which will be further described below. Switching control circuit 67 also includes an AND-gate 67b, a NOR-gate 67e and a NAND-gate 67g which each receive, as inputs, an output signal y from up-down counter 66 and clock signal CL1. Also included in switching control circuit 67 is a NOR-gate 67c, an AND-date 67d and an OR-gate 67f which each receive, as inputs, output signal y from up-down counter 66 and clock signal CL2. An inverter 67o receives as its input a second output signal x from up-down counter 66. Switching control circuit 67 also includes NOR-gates 67h, 67i, 67j and 67k as well as NAND-gates 67l and 67m and an inverter 67n, the connections of which will now be described.

NOR-gate 67h receives, as inputs, the output of NOR-gate 67a and clock signal CL1. NOR-gate 67i receives the output of NOR-gate 67a and clock signal CL2 as inputs. NOR-gate 67j receives the outputs of inverter 67o, AND-gate 67b and NOR-gate 67c as inputs. NOR-gate 67k receives the outputs of inverter 67o, AND gate 67d and NOR-gate 67e as inputs. NAND-gate 67l receives output signal x of up-down counter 66, the output of OR-gate 67f and the output of NAND-gate 67g as inputs. NAND-gate 67m receives, as inputs, the output of inverter 67n, which itself receives as its input the output of NOR-gate 67a, and clock signal CL2.

Switching circuit 64, including the connections between and among switching control circuit 67, switches SW61–SW67 and capacitors 61, 62, 63 will now be described. One end of SW61 is connected to a first end of capacitor 61 and a first end of output capacitor 7. The second end of SW61 is connected to a first end of SW62 and SW67. SW61 is controlled by the output of NOR-gate 67h. SW62 is controlled by the output of NOR-gate 67i. The second end of SW62 is connected to a first end of SW63 and the second end of capacitor 61. SW63 is also controlled by the output of NOR-gate 67h and has its second end connected to a first end of SW65, a first end of capacitor 63 and a first end of SW64. First end of SW64 is connected to the first end of capacitor 63. The second end of SW64 is connected to the second end of capacitor 7. SW64 is controlled by the output of NAND-gate 67m. The second end of SW65 is connected to the second end of capacitor 62 and a first end of SW65. SW65 is controlled by the output of NAND-gate 67l. The second end of SW66 is connected to the second end of capacitor 63 and the second end of SW67. SW 66 is controlled by the output of NOR-gate 67k. SW67 is controlled by the output of NOR-gate 67j.

Control circuit 40 includes a logic circuit 45 and a selector 46, the structure and operation of which is the same as that of selector 43. An output signal L1 (similar to output signal LO in FIG. 4) of logic circuit 45 is received as an input by selector 46. Selector 46 provides two outputs to voltage boosting control circuit 65, an up-signal U1 and a down-signal D1. Logic circuit 45 provides a reset R1 output to voltage boosting control circuit 65. Voltage boosting control circuit 65 provides two output signals x and y to switching control circuit 67 and to logic circuit 45.

Voltage boosting control circuit 65 is constituted by 2-bit up-down counter 66. Switching control circuit 67 is controlled and the boost or increase in the voltage across output capacitor 7 is changed in accordance with outputs x, y of voltage boosting control circuit 65.

An up-input terminal of up-down counter 66 receives up-signal U1 from control circuit 40, which operates to control the supply voltage Vs. Down-signal D1 is inputted to a down-input terminal of counter 66 from control circuit 40. The up-signal U1 and the down-signal D1 is supplied from selector 46. Accordingly, the setting signal S0 and the resetting signal R0 can be assigned to the up-signal U1 and the down-signal D1, respectively.

Voltage boosting portion 60 is constructed in such a manner as to be controlled when the supply voltage Vs is further increased or decreased independently of controlling the power consuming portion 70. Moreover, when passing control to mechanical rotation control portion 30, resetting signal R1 is supplied from logic circuit 45 to counter 66 so as to be able to reset voltage boosting portion 60. Logic circuit 45 operates when the supply voltage is not lowered even under the control of voltage boosting portion 60 and power consuming portion 70.

An operation of voltage boosting portion 60 in accordance with the first embodiment of the invention will now be described with particular reference to FIGS. 8(a)–8(d) and 9(a)–9(d). When an output (y, x) of up-down counter 66 is (0, 0), all of the voltage boosting capacitors 61, 62 and 63 and output capacitor 7 are connected in parallel with electricity generating portion 4 during both charging and recharging. Therefore, an output voltage Vo of electricity generating portion 4 is detected at output capacitor 7 without having been changed. Further, an electric current, equivalent to a consumed electric current i, flows from output capacitor 7 to electricity generating portion 4.

When the supply voltage Vs becomes higher than the reference voltage Vref, the up-signal U1 is outputted from control circuit 40 to voltage boosting control circuit 65, and the output (y, x) of up-down counter 66 becomes (0, 1). In response thereto, the input signals to switching circuit 67 from up-down counter 66 change.

During the charging operation, voltage boosting capacitors 62 and 63 are connected in series with each other and capacitors 62, 63 are connected in parallel to voltage boosting capacitor 61, electricity generating portion 4 and output capacitor 7. During recharging, voltage capacitors 62 and 63 are connected in parallel with each other and together, capacitors 62 and 63 are connected in series to voltage boosting capacitor 61. Together, voltage boosting capacitors 61, 62, 63 are connected in parallel to capacitor 7. Therefore, a voltage 1.5 times the output voltage of electricity generating portion 4 is applied to output capacitor 7. Conversely, in the step of charging, a voltage (1/1.5) times the supply voltage Vs of the output capacitor 7 is applied by electricity generating portion 4. In the step of charging, an electric current 1.5 times the electric current i used for charging output capacitor 7 flows from electricity generating portion 4.

When the output (y, x) of up-down counter 66 is (0, 1) and the supply voltage Vs becomes higher than the reference voltage Vref, an up-signal U1 is inputted to up-down counter 66 from control circuit 40. The output (y, x) of up-down counter 66 is then changed to (1, 0). In such a state, in the step of charging, voltage boosting capacitors 61, 62 and 63 are each connected in parallel to electricity generating portion 4 and are charged. In the step of recharging, voltage boosting capacitors 62 and 63 are connected in parallel with each other, and together capacitors 62 and 63 are connected in series with voltage boosting capacitor 61. Together, capacitors 61, 62 and 63 are connected in parallel with output capacitor 7. Thus, an output voltage equal to twice the input voltage is detected across output capacitor 7. Consequently, in the step of charging, an electric current 2 times the electric current i used for charging output capacitor 7 flows from electricity generating portion 4.

It is illustrated that an up-signal U1 is inputted from control circuit 40 to up-down counter 66 if the supply voltage Vs becomes higher than the reference voltage Vref even in a state in which the output (y, x) of the up-down counter 66 is (1, 0). Thereby, the output (y, x) of the up-down counter 66 is changed to (1, 1). In this state, voltage boosting capacitors 61, 62 and 63 are all connected in parallel to electricity generating portion 4 and are further charged in the step of charging. In the step of recharging, voltage boosting capacitors 61, 62 and 63 are all connected in series with electricity generating portion 4 and together, capacitors 61, 62 and 63 are all connected in parallel with output capacitor 7. Consequently, an output voltage equal to three times the input voltage is detected at output capacitor 7. In the step of recharging, an electric current 3 times the electric current i used to charge output capacitor 7 is outputted from electricity generating portion 4, thereby, further reducing the rotating speed of electricity generating portion 4. Moreover, the unwinding speed of the power spring is also reduced. Furthermore, the energy of the power spring, which corresponds to the triple torque in comparison with the case where the output (y, x) of the up-down counter 66 is (0, 0), can be used for generating the energy of the power spring.

In contrast, when the supply voltage Vs becomes lower than the reference voltage Vref, a down-signal D1 is inputted from control circuit 40 to up-down counter 66, and the output (y, x) of counter 66 is changed from (1, 1) to (1, 0). Moreover, the boost in the voltage, more particularly, a boosting ratio employed in the switching circuit 64 is lowered from 3 times to 2 times. Thereby, the electricity generating portion 4 is put into a state where the portion 4 can generate electricity when the torque thereof is small. Furthermore, the rotating speed thereof is raised and thus the portion 4 becomes in a state where predetermined electric power can be supplied therefrom. Similarly, when the supply voltage Vs decreases even in such a state, the boosting ratio (Vs/Vo) is changed from 2/1 to 1.5/1 and is then further changed into 1/1. Moreover, if the supply voltage Vs becomes higher than the reference voltage Vref as the result of storing energy in the power spring by winding up the spring or of releasing the supply portion from the equipment connected to the generator on the way, conversely, the up-signal D1 is inputted from the control circuit 40 to the up-down counter 66 and the boosting ratio is increased.

Figure 10:
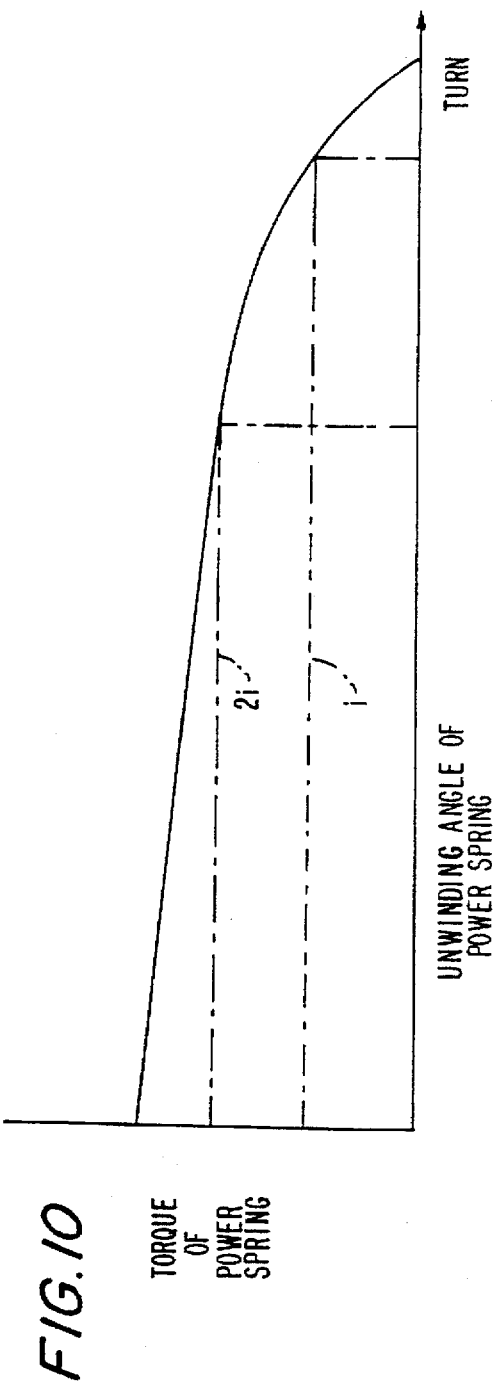
FIG. 10 is a graph illustrating the relation between the torque of a power spring of the electricity generating device of FIG. 1 and the unwinding angle thereof.
Figure 11:
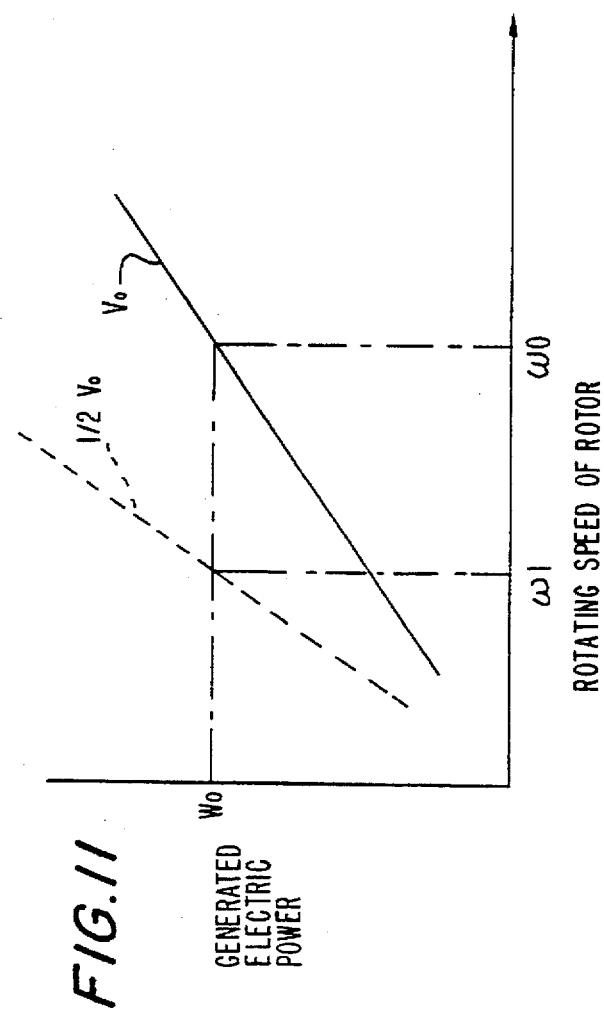
FIG. 11 is a graph illustrating the relation between the rotation speed and electric power generated by a dynamo of the electricity generating device of FIG. 1.

Reference is now made to FIGS. 10 and 11 which illustrate the characteristics of electricity generating portion 4, which generates electricity by using the energy stored in the power spring. In particular, FIG. 10 illustrates the relation between the torque of the power spring at the time of generating electricity and the unwinding angle thereof and FIG. 11 illustrates the relation between the generated electric power and the rotating speed of the rotor.

In the example where the rotating speed of the rotor is a constant value w0, the electric power corresponding to a constant current i is supplied from the dynamo. Thus, a part of the energy stored in the power spring, which corresponds to the torque corresponding to the current i, is consumed for generating electricity. The rest of the stored energy is consumed by the brake or the like for holding the rotating speed of the rotor constant. Consequently, the part of the energy, which is consumed for generating electricity, can be increased by boosting the electric current i flowing through the dynamo. Namely, the remaining part of the stored energy to be wasted by the brake or the like can be reduced. For example, if the same electric power is generated, the braking amount, namely, the reduction in the rotating speed can be increased by doubling the electric current flowing through the dynamo. Therefore, as is seen from FIG. 10, most of the energy, which would be wasted in the conventional generator, can be consumed for generating electricity. At that time, the rotating speed of the rotor becomes w1 which is less than w0. Thus, the unwinding speed of the power spring becomes low. Such a state, in which the ability of generating electricity is high, is maintained so that the power spring can generate the torque corresponding to the double electric current.

Further, as illustrated in FIG. 11, the electric power generated by the electricity generating portion 4 is nearly proportional to the rotating speed of the rotor in the case where the same voltage is outputted therefrom. Thus, even if the generated power is the same as Wo, the doubled electric current is outputted from the electricity generating portion. Further, if the output voltage is reduced to half, the rotating speed of the rotor can be lowered. As described above, in the case of the voltage boosting portion 60 of this embodiment, the electric current flowing through the electricity generating portion 4 can be doubled by reducing the output voltage of this portion to half when the supply voltage Vs is higher than the reference voltage Vref. Thereby, the rotating speed of the electricity generating portion 4 can be reduced. Moreover, a larger part of energy in the range which can be covered by the torque generated by the power spring can be consumed for generating electricity. Therefore, the unwinding speed of the power spring can be lowered by controlling the boost or increase in the voltage by means of the voltage boosting portion 60. Simultaneously, the effective utilization of the energy stored in the power spring can be achieved.

Reference is once again made to FIG. 1 to describe the configuration of power consuming portion 70 of electricity generating device 1. Power consuming portion 70 includes variable resistance circuit 71 and resistance valve control circuit 72. Resistance value control circuit 72 is constituted by the 3-bit up-down counter 73. Variable resistance circuit 71 is connected in parallel with electricity generating portion 4. Resistance value control circuit 72 controls variable resistance circuit 71. Variable resistance circuit 71 includes three resistors RE1, RE2 and RE3 which are connected in parallel with each other. It is preferred that the resistance values of these resistors have the ratios 4:2:1, respectively. Resistance value control circuit 72 is controlled according to the up-signal U2 and the down-signal D2 from control circuit 40. The setting signal S0 and the resetting signal R0, which are outputs of selector 43 are equivalent to the up-signal U2 and the down-signal D2, respectively. Further, the resetting signal R2 from the logic circuit 45 is connected to counter 73. When passing control to voltage boosting portion 60 or mechanical rotation control portion 30, counter 73 is reset.

Output γ of up-down counter 73 is connected to switch SW3 which itself is connected in series with resistor RE3. Output β is connected to switch SW2 which itself is connected in series to resistor RE2, and output α is connected to switch SW1 which itself is connected in series to resistor RE1. Switch and resistor combinations SW1 and RE1, SW2 and RE2, SW3 and RE3 are each connected in parallel with electricity generating portion 4.

In power consuming portion 70, if the supply voltage Vs becomes higher than the reference voltage Vref and resistor RE1 is connected in parallel with electricity generating portion 4 when the outputs (γ, β, α) of up-down counter 73 are (0, 0, 1), up-signal U2 is inputted to the up-down counter 73 and the outputs (γ, β, α) thereof are changed to (0, 1, 0). Therefore, resistor RE2, having a resistance less than resistor RE1, is connected in parallel with electricity generating portion 4. Further, an electric current flowing through variable resistance circuit 71 is increased. Thus, electric current flowing through electricity generating portion 4, as well as a load on electrically generating portion 4 increases. Consequently, the rotating speed of electricity generating portion 4 is decreased and the unwinding speed of power spring 2 is reduced. Thus, the consumption of the energy stored in power spring 2 can be reduced. That is, when the electric power outputted from supply portion 6 is smaller than that supplied from electricity generating portion 4, the supply voltage Vs of output capacitor 7 rises. When the supply voltage Vs becomes higher than the reference voltage Vref, the resistance value of variable resistor 71 decreases. Thus the power consumption of power consuming portion 70 connected in parallel with the electricity generating portion 4 is increased. Therefore, the load on electricity generating portion 4 is increased and the rotating speed is reduced so that energy stored in the power spring is not wasted. Furthermore, if the supply voltage VS shows a tendency to increase, an output of counter 73 increases and in contrast, the resistance value of the variable resistance circuit 71 decreases. Thus, the power consumption is increased, while the rotating speed is held down.

Conversely, when the supply voltage Vs becomes lower than the reference voltage Vref, down-signal D2 is outputted from control circuit 40 to up-down counter 73. The resistors connected in parallel with one another in variable resistance circuit 71 are sequentially separated therefrom in increasing order of resistance value. Thus, the resistance value of variable resistance circuit 71 increases and the electric power consumed in power consuming portion 70 is reduced so that the load on electricity generating portion 4 becomes small and the rotating speed thereof increases. Consequently, the ability to generate electricity by using the energy of power spring 2 is increased, and the supply voltage Vs rises.

Figure 12:
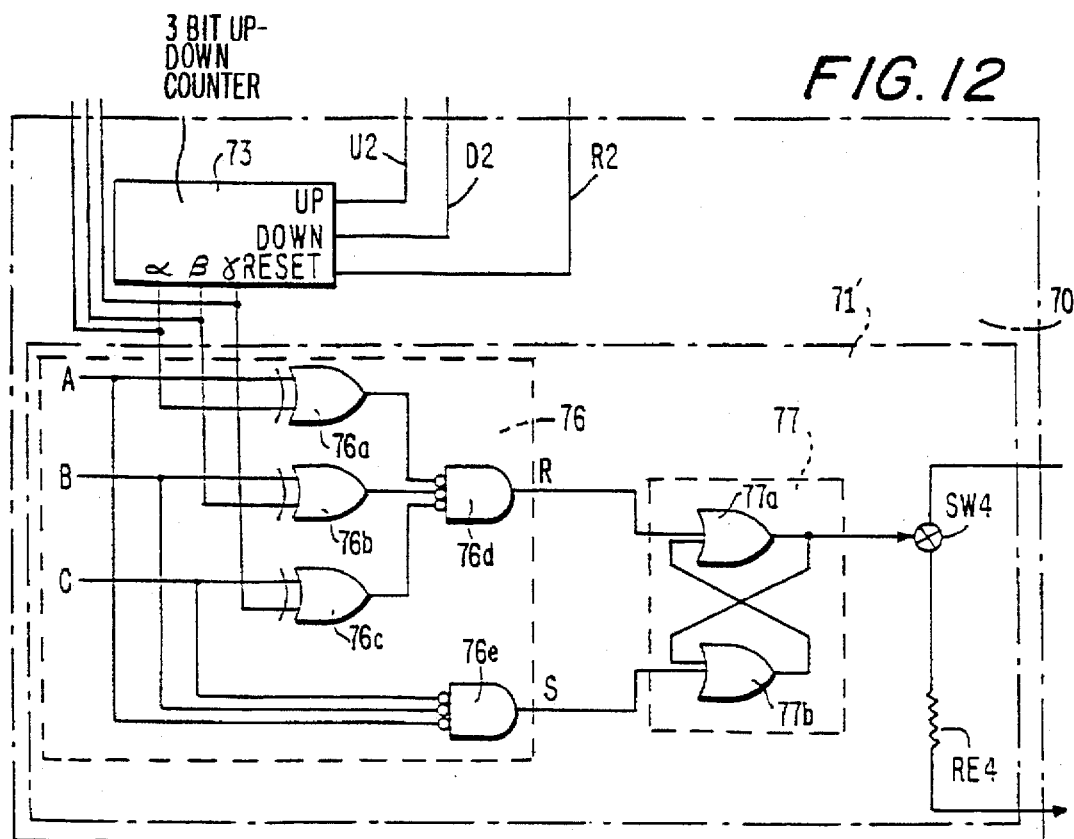
FIG. 12 is a schematic diagram of a power consuming portion in accordance with another embodiment of the present invention.
Figure 13:
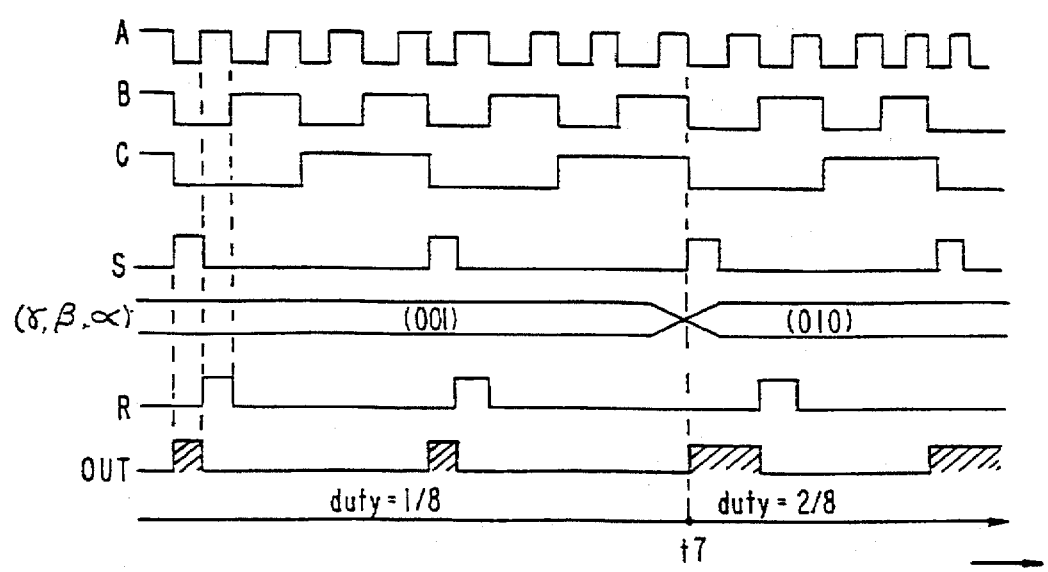
FIG. 13 is a timing diagram of the power consuming portion of FIG. 12.

Reference is now made to FIGS. 12 and 13 which illustrate an example of a power consuming portion 70' in accordance with another embodiment of the present invention. Like reference numerals in this embodiment as those in the previous embodiments indicate like structures. Power consuming portion 70' increases or decreases the self-consumption of the electric power by controlling the duty factor. Power consuming portion 70' includes an up-down counter 73 and a variable resistance circuit 71', which itself includes a switching circuit 76 coupled to up-down counter 73, a selector 77 coupled to switching circuit 76 and a switch SW4, in series with a resistor RE4 and connected to switching circuit 76 by selector 77. Resistor RE4 is connected in parallel with electricity generating portion 4. Switch SW4 determines whether resistor RE4 is loaded or unloaded. Similarly, up-down counter 73 is controlled in accordance with the up-signal U2 and the down-signal D2 outputted from control circuit 40. Switching circuit 76 receives as inputs the outputs (γ, β, α) of counter 73 and pulse signals A, B and C (generated at control circuit 40), which each have different duty factors.

Switching circuit 76 includes exclusive OR-gates 76a, 76b and 76c, and AND-gates 76d, 76e. Exclusive OR-gate 76a receives, as inputs, pulse signal A and output α of up-down counter 73. Exclusive OR-gate 76b receives, as inputs, pulse signal B and output β of up-down counter 73. Exclusive OR-gate 76c receives, as inputs, pulse signal C and output γ of up-down counter 73. AND-gate 76d receives, as inputs, the logic inverse of the outputs of exclusive OR-gates 76a, 76b and 76c.

Selector 77 determines whether switch SW4 is open or closed by using outputs of switching circuit 76. Selector 77 includes two OR-gates 77a, 77b. OR-gate 77a receives, as inputs, the output of AND-gate 76d and the output of OR-gate 77b. OR-gate 77b receives, as inputs, the output of AND-gate 76e and the output of OR-gate 77a. The power consumption is regulated by changing the duty factor of the switch SW4 to be turned on or off. It is also to be understood that a control operation can be achieved by using a binary counter with a reset terminal in place of the up-down counter, though this is the same with the power consuming portion and the voltage boosting portion.

As shown in FIG. 13, the pulse durations of the pulse signals A, B and C, as well as the periods thereof, are set in the ratios 1:2:4. When the outputs (γ, β, α) of up-down counter 73 are (0, 0, 1), switch SW4 is turned on and off at the duty factor of (⅛). If the supply voltage Vs becomes higher than the reference voltage Vref at a moment t7, an up-signal U2 is inputted to the up-down counter 73, and the outputs (γ, β, α) of up-down counter 73 are changed to (0, 1, 0) and the duty factor is increased to (⅜). This results in an increase in the power consumption of power consuming portion 70', an increase in the load on electricity generating portion 4 and a decrease in the rotating speed thereof. Consequently, the power supplied to the supply portion is reduced and the supply voltage has a tendency to be reduced.

Figure 14:
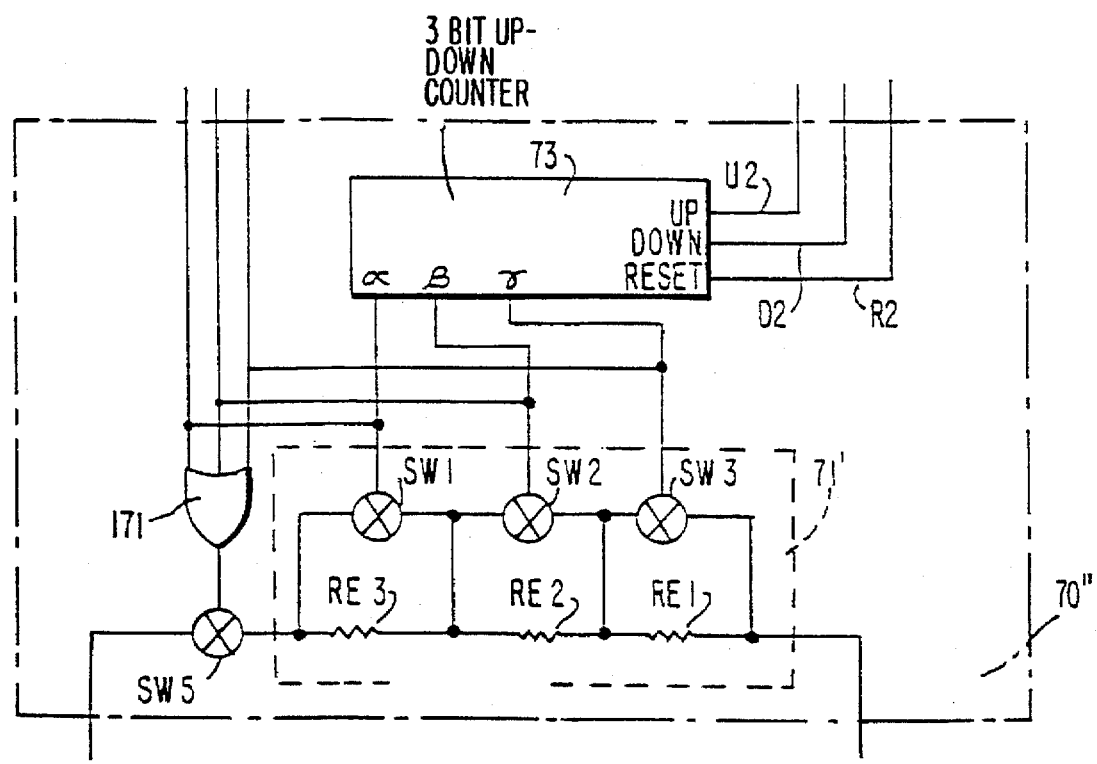
FIG. 14 is a schematic diagram of a power consuming portion in accordance with another embodiment of the present invention.

Reference is now made to FIG. 14 which illustrates a power consuming portion, generally indicated at 70", constructed in accordance with yet another embodiment of the present invention. Power consuming portion 70" includes a variable resistance circuit 71" a switch SW5, an AND-gate 171 and counter 73. Variable resistance circuit 71" includes three resistors RE1, RE2 and RE3 which are connected in series with one another, and three switches SW1, SW2 and SW3 which are each connected in parallel with resistors RE1, RE2 and RE3, respectively. Switches SW1, SW2 and SW3 are further connected in series with each other. Switch SW5 is connected in series with resistors RE1, RE2 and RE3 and is controlled by AND-gate 171 which receives the $\alpha$, $\beta$ and $\gamma$ outputs of counter 73 as its inputs.

During the time when counter 73 is in a reset state where the outputs ($\gamma$, $\beta$, $\alpha$) thereof are (0, 0, 0), power consuming portion 70" is separated from electricity generating portion 4 so that all of the electric power generated by using the mechanical energy at that time can be outputted to supply portion 6. Outputs of counter 73 establish the paths for bypassing particular resistors. The power consumption thereof is regulated by controlling the resistance value of variable resistance circuit 71, similar to the aforementioned example.

Power consuming portion 70' controls the self-consumption by changing the duty factor and the resistance value. In accordance therewith, the rotating speed of electricity generating portion 4 can be carefully controlled by utilizing a relatively simple electrical configuration. In contrast, in the embodiment where the control method using voltage boosting portion 60 is utilized, the connection among the voltage boosting capacitors are varied. This results in more complex circuit configurations and control operations.

It is also understood that a control operation for controlling the rotating speed of electricity generating portion 4, which is other than the aforementioned 4-stage control operation, can be achieved by increasing the number of the voltage boosting capacitors. For that purpose, a more complex circuit becomes necessary. However, a part of the energy stored in power spring 2, which would be wasted in the conventional generator as heat or mechanical loss, can be consumed by boosting the voltage so as to generate electricity. Thus, the electricity generating device in accordance with this embodiment has a tremendous advantage in that the energy stored in power spring 2 can be effectively utilized. Moreover, the rotation control portion for mechanically controlling the rotating speed of the electricity generating portion can hardly achieve the careful control of the rotating speed but can completely stop the electricity generating portion. Thereby, where there is no external equipment coupled to and utilizing the electric power supplied from the electricity generating device, the energy stored in the power spring can be conserved. In view of the advantages afforded by these control methods, it is preferable that the control method using the voltage boosting portion is performed preferentially over the control method utilizing the power consuming portion and that the mechanical control method is carried out preferentially over the operation of controlling the load on the electricity generating portion. The rotating speed of the electricity generating portion can be roughly controlled by combining the control method, which uses the voltage boosting portion, with the control method which uses the power consuming portion. Incidentally, various combinations of such control methods can be employed.

Figure 15:
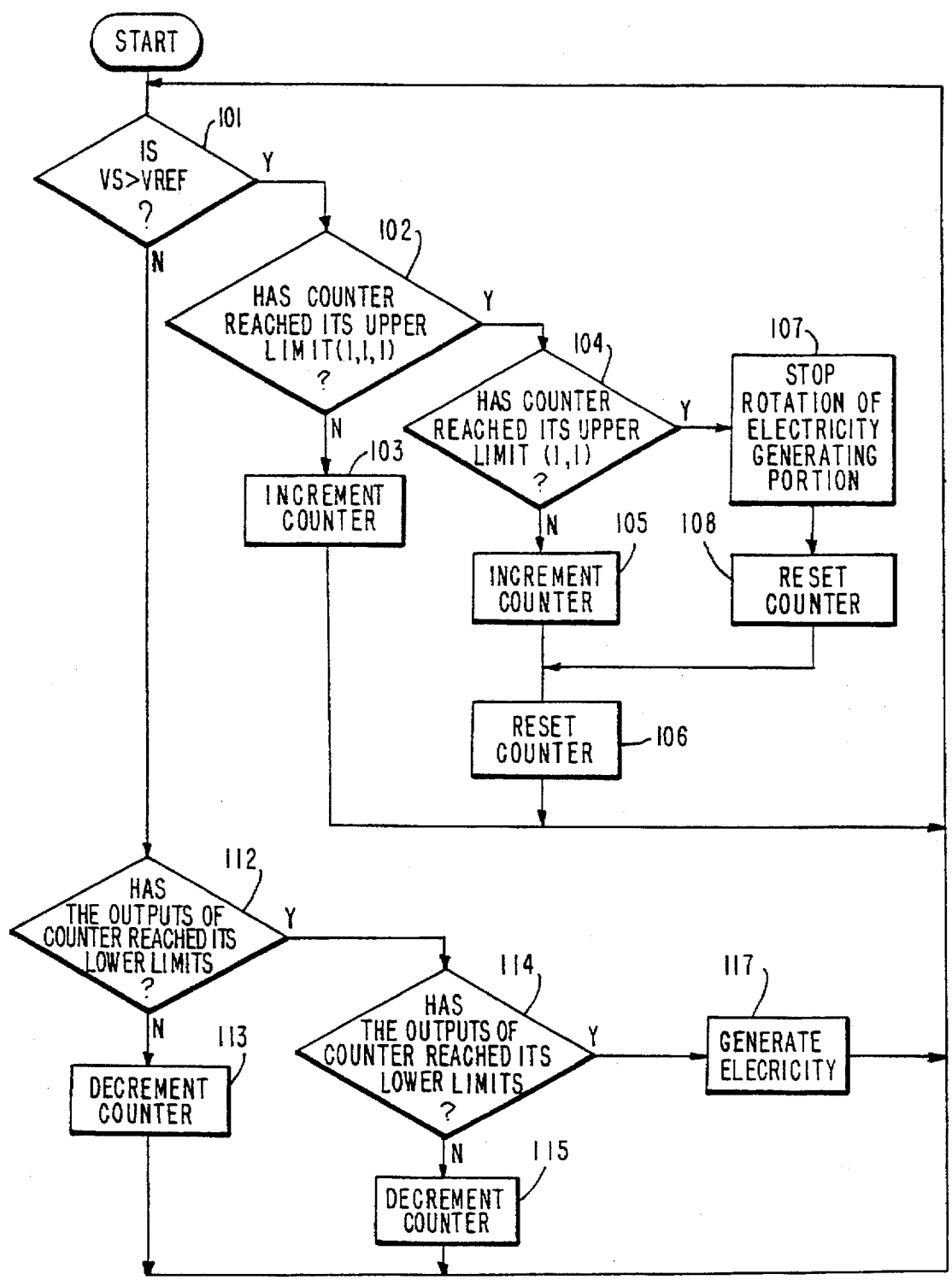
FIG. 15 is a flowchart of a control operation of the electricity generating device in accordance with the present invention.

Reference is now made to FIG. 15, which illustrates a flowchart of the control steps performed by the rotation control portion employed in the electricity generating device of the embodiment of FIG. 14. The supply voltage Vs is compared with the reference voltage Vref in step 101. If the supply voltage Vs exceeds the reference voltage Vref, the rotating speed of the electricity generating portion is reduced. As indicated in step 102, it is determined whether the outputs of counter 73 of the power consuming portion have reached its upper limit (1, 1, 1). If the outputs of the counter 73 have not reached the upper limit, counter 73 is incremented and the rotating speed is controlled by the power consuming portion 70" in step 103. Subsequently, the process returns to step 101. If it is determined in step 102 that the outputs of counter 73 have reached its upper limit, the process advances to step 104 where it is determined whether the outputs of counter 66 of voltage boosting portion 60 have reached its upper limit (1, 1). If the outputs of counter 66 have not reached its upper limit, counter 66 is incremented and the rotating speed is controlled by the voltage boosting portion in step 105. Then, counter 73 of the power consuming portion is reset in step 106 so as to ensure a range, in which the rotating speed is controlled by the power consuming portion. The process then returns to step 101.

If it is determined in step 104 that the outputs of counter 66 have reached its upper limit, the process advances to step 107 whereupon the mechanical control method is performed and finally, the rotation of the electricity generating portion is stopped. Further, counter 66 of the voltage boosting portion and counter 73 of the power consuming portion are reset in steps 108 and 106, respectively. The process then returns to step 101 whereupon the supply voltage Vs is compared with the reference voltage Vref.

If it is determined in step 101 that the supply voltage Vs is not greater than the reference voltage Vref, a control operation of increasing the rotating speed of the electricity generating portion 4 is performed. Specifically, in step 112 it is determined whether the outputs of counter 73 of the power consuming portion have reached its lower limit, namely, whether counter 73 is reset. If the outputs of counter 73 have not reached their lower limits and therefore counter 73 is not reset, counter 73 is decremented and the rotating speed of the electricity generating portion is increased in step 113. However, if it is determined in step 112 that counter 73 is in a reset state, it is still further determined in step 114 whether counter 66 of the voltage boosting portion has reached its lower limit, namely, whether counter 66 is reset. If it is determined that counter 66 is not reset, counter 66 of the voltage boosting portion is decremented and the rotating speed of the electricity generating portion is increased. In contrast, if the counter of the voltage boosting portion is in a reset state, the mechanical control is in an on-state and the mechanical control is put into an off-state in step 117. Then, the electricity generating portion starts generating electricity and supplying the generated electric power to the supply portion.

In the case of the cooperative control process of this embodiment, if the supply voltage tends to decrease, the electricity generating ability of the electricity generating portion is brought out as much as possible in order to prevent an occurrence of shortage of the electric power supplied from the supply portion. For example, if the supply voltage decreases when the electricity generating portion is stopped by performing the mechanical control method, the electricity generating portion is activated while counters 66 and 73 are reset, i.e. during the time when neither the power consuming portion nor the voltage boosting portion controls the rotating speed. Moreover, the electricity generating portion supplies slightly excessive electric power to the supply portion. Thereby, the supply voltage is prevented from decreasing rapidly. The cooperative control method is not limited to that employed in this embodiment. For instance, it is apparent that the activation of the electricity generating portion may be performed when each of the counters 73 and 66 is put into a controlled state. Alternatively, the control method to be performed by the power consuming portion may be further carried out preferentially over the control method to be performed by the voltage boosting portion. The supply voltage Vs can be held nearly constant and the waste of the energy stored in the power spring can be prevented by performing the combination of the control operations to be respectively performed by the power consuming portion, the voltage boosting portion and the mechanical rotation control portion, in this manner. Moreover, in the case of the electricity generating device of this embodiment, even a part of the energy stored in the power spring, which has not been used in the conventional electricity generating device, can be utilized for generating electricity. Furthermore, even when no equipment being operative to the supply power is connected to the electricity generating device, the power spring can be prevented from unwinding. Consequently, the lifetime of the electricity generating device, during which electricity can be generated by the generator, can be extended considerably. Further, an electricity generating device having excellent ability to generate electricity can be realized.

Figure 16:
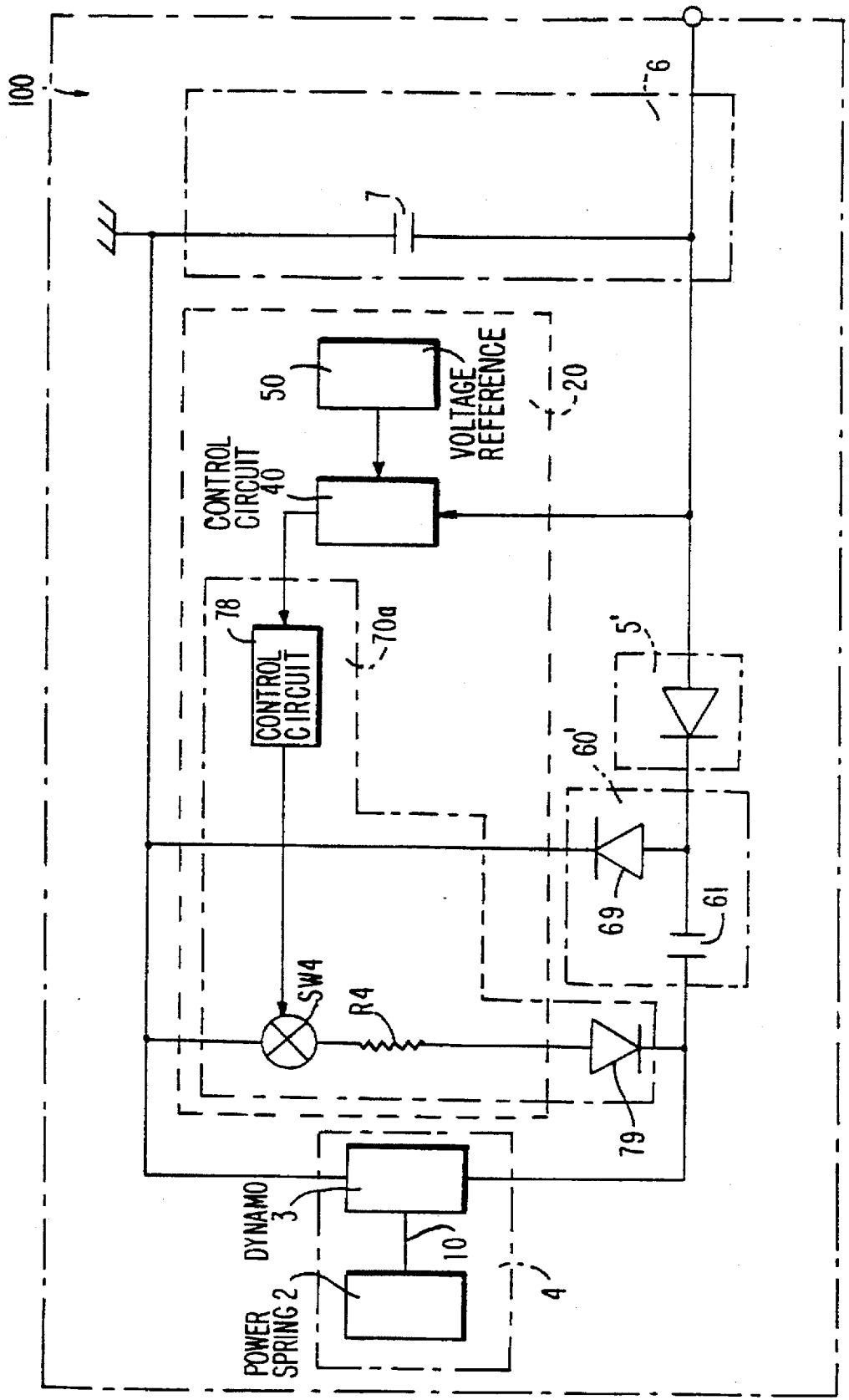
FIG. 16 is a block diagram of an electricity generating device in accordance with another embodiment of the present invention.

Reference is now made to FIG. 16 which illustrates a block diagram illustrating the configuration of an electricity generating device, generally indicated as 100, in accordance with another embodiment of the present invention. Like numerals are utilized to indicate like structures, the primary difference being the components making up the larger structures. Electricity generating device 100 includes electricity generating portion 4 for generating electricity and a rectification portion 5' coupled to electricity generation portion 4 by a boosting portion 60'. Electricity generating portion 4 generates electricity by the rotation of a dynamo 3 by use of the energy stored in power spring 2. A supply portion 6 coupled to electric generating portion 4 supplies the electric power to an external circuit. A reference voltage generating circuit 50 inputs a reference voltage to control circuit 40, both of which are mounted on the control IC 20.

Electricity generating device 100 includes rectification portion 5' for performing a half-wave rectification on an a.c. current generated by electricity generating portion 4. Electricity generating device 100 also includes voltage boosting portion 60' having a voltage boosting capacitor 61 to be charged by an electric current, the polarity of which is opposite to that of the current to be rectified by rectification portion 5'. Voltage boosting portion 60' includes a diode 69 coupled to a capacitor 61. Electric power supplied from electricity generating portion 4 to voltage boosting capacitor 61 is passed through diode 69 when the current has the opposite polarity. Moreover, electricity generating device 100 further includes power consuming portion 70a for controlling the rotating speed of electricity generating portion 4. Power consuming portion 70a is adapted to control a consumed current by changing the duty factor. Thus, the power consuming portion 70a has on/off switch SW4 coupled between a resistor RE4 and control circuit 78, which are similar to that previously described with reference to FIG. 12. Resistor RE4 is connected to electricity generating portion 4 through a diode 79 which permits an electric current, having a polarity the same as the polarity of rectified current, to flow through resistor RE4. Additionally, power consuming portion 70 includes a control circuit 78 for controlling switch SW4. Control circuit 78 performs the functions of up-down counter 73, the switching circuit 76 for changing the duty factor and selector 77, all of which have been previously described with reference to FIG. 12.

In the case of the electricity generating device 100, when dynamo 3 is driven by power spring 2, an electric current flows through voltage boosting capacitor 61 and through diode 69 in a half period of the a.c. output of dynamo 3. Thus, capacitor 61 is charged. In the next half period, an electric current flows through output capacitor 7 by way of rectification portion 5 and thus capacitor 7 is charged. At that time, voltage boosting capacitor 61 and electric generating portion 4 are connected in series with each other. Consequently, a voltage that has been boosted to twice the original value is detected across output capacitor 7, which is thus charged.

Controlling the rotating speed of electricity generating portion 4 is performed by power consuming portion 70. When supply voltage Vs from output capacitor 7 becomes higher than reference voltage Vref, control circuit 78 increases the on-period per unit time, during which switch SW4 is turned on, namely, increases the duty factor. This results in an increase in the electric current flowing through electricity generating portion 4. Further, an increase in the load on electricity generating portion 4 causes the electromagnetic brake to increase. As a result, the rotating speed of electricity generating portion 4 decreases. Further, a period of time, during which the current bypasses the power consuming portion 70, increases. Thus, a charging time, during which the output capacitor 7 is charged, is shortened. Therefore, the electricity generating ability of electricity generating portion 4 is deteriorated by increasing the duty factor of the switch SW4. Moreover, the reduction in the charging time of output capacitor 7 results in a drop of supply voltage Vs.

Furthermore, electricity generating device 100 includes voltage boosting portion 60 for boosting the voltage supplied thereto to twice in value at all times and for charging the output capacitor by using the voltage boosted in this way. Therefore, as previously described, the same supply voltage Vs can be obtained at half the rotating speed of electricity generating portion 4. Thereby, the losses depending on the rotating speed, such as air resistance and a mechanical loss, can be reduced. Consequently, the energy stored in the power spring can be effectively utilized.

It is preferable that the diode used for rectification or the like has the characteristic of a small forward voltage drop and a small inverse leakage current. A Schottky diode, for example, may be effectively used as such a diode.

Figure 17:
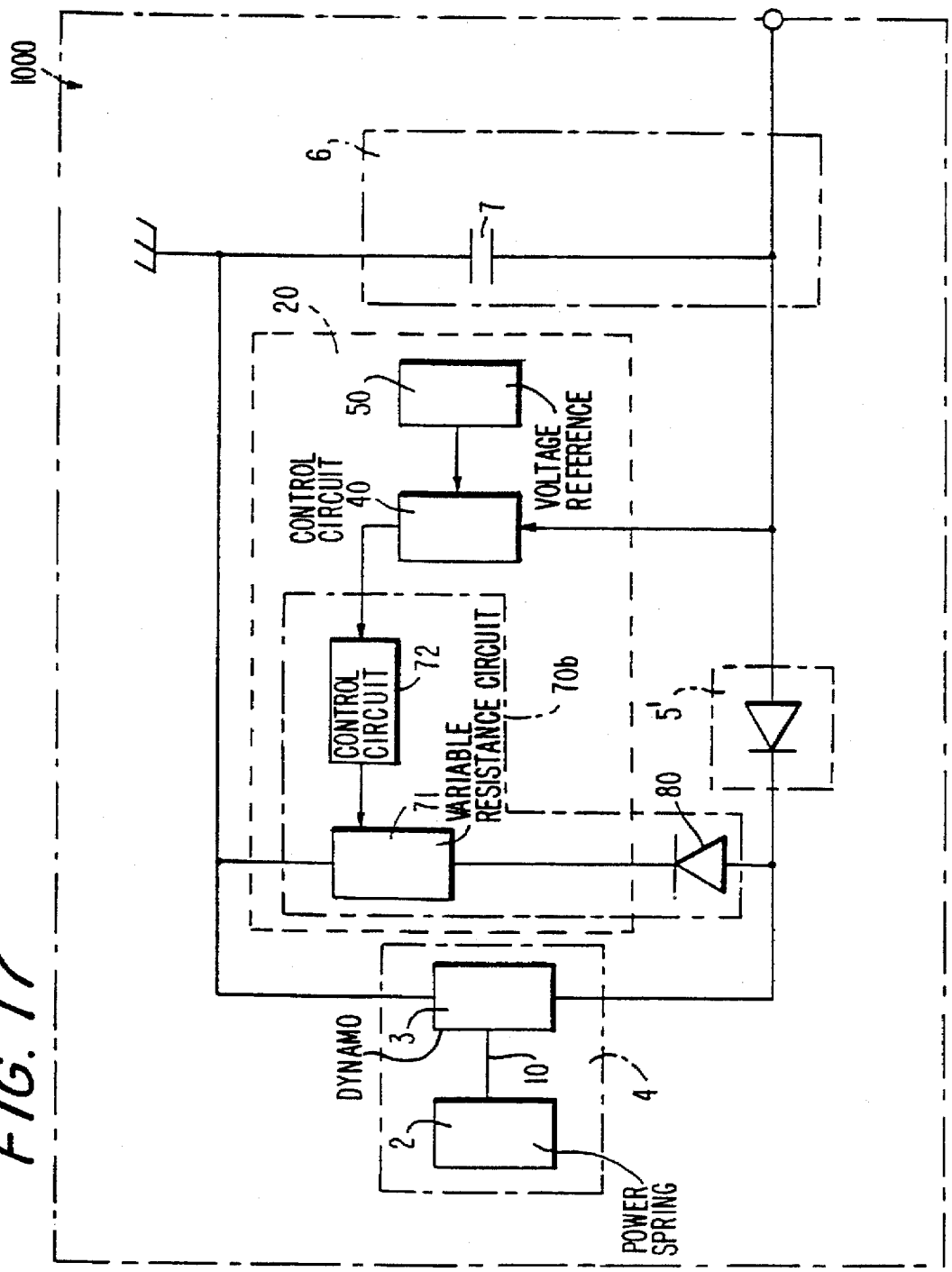
FIG. 17 is a block diagram of an electricity generating device in accordance with another embodiment of the present invention.

Reference is now made to FIG. 17 which illustrates a block diagram of an electricity generating device in accordance with another embodiment of the present invention. Structure having the same reference numerals as those structures of earlier embodiments have identical functions. Electricity generating device 1000 includes electricity generating potion 4 for generating electricity by rotating dynamo 3 by use of the energy stored in power spring 2, and supply portion 6 for supplying the electric power to an external circuit. Further, circuits such as reference voltage generating circuit 50 and control circuit 40 are mounted on control IC 20.

Electricity generating device 1000 of this embodiment employs power consuming portion 70b which can change the resistance value to control the rotating speed of electricity generating portion 4. Variable resistance circuit 71 and resistance value control circuit 72, as described in FIG. 1, are mounted on control IC 20. These circuits are controlled by control circuit 40. Further, similarly as in the case of the fifth embodiment, a half-wave rectification is performed in rectification portion 5' of electricity generating device 1000. Power consumption circuit 70b includes a variable resistance circuit coupled between a diode 80 and control circuit 72. Diode 80 and variable resistance circuit 71 are coupled in series with each other and in parallel with electricity generating portion 4. Moreover, diode 80 allows an electric current, the polarity of which is opposite to that of the current to be rectified by the half-wave rectification, flow through the variable resistance circuit 71. Thus, the current flowing through power consuming portion 70 of electricity generating device 1000, to control the rotating speed of the electricity generating portion 4, is separated from the current for charging the output capacitor 7. Consequently, the electric power can be supplied to the output capacitor 7 at a stable voltage. The power or energy charged in output capacitor 7 is never consumed in power consuming portion 70.

In the case of this embodiment, the foregoing objects of the present invention can be achieved by employing a simple circuit configuration in this manner when an a.c. dynamo is used. Namely, in comparison with the conventional electricity generating device, the rotating speed of electricity generating portion 4 can be controlled without wasting the energy stored in the power spring and the unwinding speed of the power spring can be reduced. The energy released from the power spring can be reduced in line with the power supplied from the supply portion. A period of time required for completely unwinding the power spring, namely, the lifetime of the electricity generating device can be extended. Even in the case where the power consumption of the equipment connected to the supply portion varies, the energy released from the power spring can be minimized according to the power consumption at that time. Consequently, the lifetime of the electricity generating device can be extended.

In the foregoing description, the present invention has been explained by describing the electricity generating device, in which the electric power is supplied from the supply portion to an external equipment, as an example. Further, the electricity generating device of the present invention may be incorporated into electric equipment. The electricity generating device of the present invention may be used in a portable telephone, a hand-held video camera, a clock, a watch, a stopwatch, a radio and the like. Namely, the electricity generating device of the present invention has broad applicability.

The aforementioned components of the electricity generating device such as the control circuit and the reference voltage generating circuit are merely examples of publicly known components. The present invention is, however, not limited to the aforementioned components of the electricity generating device. Moreover, the aforesaid embodiments are of the type in which each of the control circuits is driven by using the generated power. The power consumption of the control IC, on which these circuits are mounted, is very low. Apparently, the control circuits or the like can be driven by using a small button-like battery.

Figure 18A:
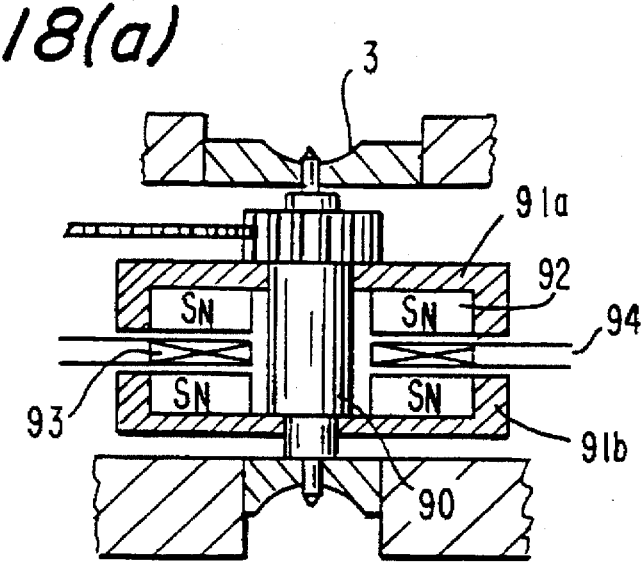
FIG. 18(a) is a sectional view of a dynamo constructed in accordance with the present invention.
Figure 18B:
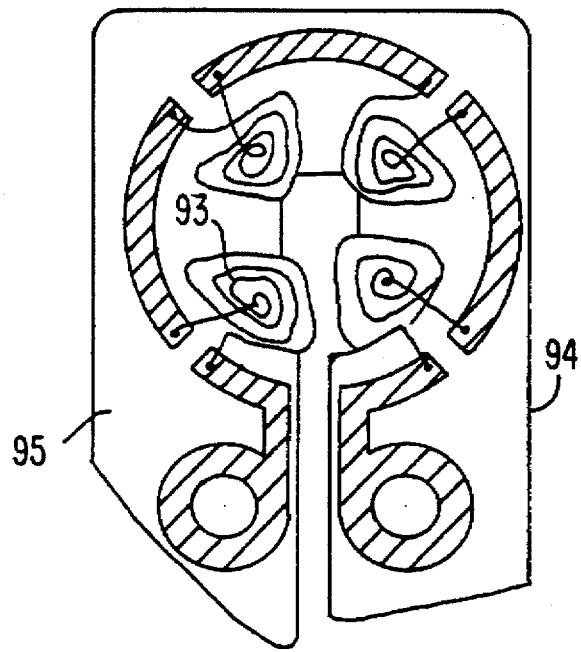
FIG. 18(b) is a diagram of a stator of the dynamo of FIG. 18(a).

The dynamo of the electricity generating device of the present invention is not limited to that of the type in which the rotor rotates in a space between the stators. For example, a dynamo of the type as shown in FIGS. 18(a) and 18(b), which is similar to a brushless motor, may be used. Dynamo 3 of FIGS. 18(a) and 18(b) includes a pair of nearly cylindrical back yokes 91, a rotor 90, and disk-like magnets 92. Yokes 91a, 91b are attached to the upper and lower parts of rotor 90 and disk-like magnets 92 provided on the inner surfaces of yokes 91a, 91b. Further, a stator 94 having coils 93 formed on a board or substrate 95 is inserted into a space therebetween. Moreover, because a magnetic circuit composing the stator 94 does not include a stator coil which would cause an iron loss, the loss can be reduced. Furthermore, in dynamo 3, the number of turns corresponding to a magnetic flux can be decreased. Thus, the loss due to the resistance of the coil is small. In other words, a heavy-current can be easily drawn from dynamo 3. Incidentally, owing to the fact that the rotor protrudes from both side surfaces of stator 94, the electricity generating device should have some thickness when incorporating the dynamo thereinto. Therefore, this dynamo is suitable for an electricity generating device of the type that has some allowable thickness.

Furthermore, the type of the dynamo of the present invention is not limited to the a.c. type. If a generator of the d.c. type is used in the electricity generating portion, the rectification portion becomes unnecessary. It is also sometimes preferable that the electric generating device is provided with a diode for preventing the generator from being driven like a motor by a reverse current drawn from the output capacitor or the like.

Further, in the foregoing descriptions of the embodiments, the typical power spring as employed in a clock has been described as a simple example. The power spring of the present invention is not limited thereto. Apparently, a power spring as employed in a watch or the like may be used. Alternatively, a power spring of the type as employed in a music box, which has no driving force during being wound up, may be used. Furthermore, the control mechanism and method for use in the electricity generating device are not limited to the electricity generating device and method using a power spring. Note that the present invention can be applied to electricity generating devices, in which a generator is rotated by other kinds of springs or by energy storing means having properties such as pressure energy similarly as in the case of the power spring, and thereby, equivalent advantages can be obtained.

As described above, in the case of the electricity generating device of the present invention, the unwinding speed of the power spring can be controlled in accordance with the electric power actually supplied therefrom by controlling the rotating speed of the electricity generating portion on the basis of the voltage outputted from the supply terminal. Therefore, when the supplied electric power is low, the unwinding speed of the power spring can be reduced and thus the lifetime, during which the electricity generating device can generate electricity, can be extended considerably. In contrast, when the supplied electric power is high, the electricity generating device can deal with such a condition by increasing the amount of the generated electric power. Further, in the case of the electricity generating device of the present invention, even when the supplied electric power is very low, or when no electric equipment is connected thereto, the energy stored in the power spring can be conserved by employing a mechanical control for controlling the rotating speed. Moreover, the rotating speed of the electricity generating portion can be controlled by boosting the voltage thereof. Simultaneously with this, a part of energy of the power spring, which would be wasted in the conventional generator as brake loss, can be changed as being used for generating electricity. Furthermore, the rotating speed of the electricity generating portion can be controlled with high accuracy by regulating the variable resistance or the duty factor so as to control the self-consumption electric power. Each of these control methods working alone or in combination act as a mechanical energy release control. Therefore, by combining these control methods with each other, there is provided an electricity generating device which is very effective in the case where a disaster occurs, or in the case of regions provided with no power transmission networks and has a long lifetime and can achieve the self-adjustment of the power.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An electricity generating device capable of storing mechanical energy, comprising:

an electricity generating portion capable of transforming mechanical energy into electric energy and outputting electric power;

a supply portion, operatively coupled to said electricity generating portion, outputting a supply voltage and supplying the electric power outputted from the electricity generating portion to an external circuit; and a mechanical energy release control, operatively coupled to the electricity generating portion, controlling the rate at which mechanical energy is converted to electrical energy by the electricity generating portion in accordance with the supply voltage supplied from the supply portion, said mechanical energy release control controlling the release of mechanical energy by controlling an output current of the electricity generating portion in accordance with the supply voltage supplied from the supply portion, the mechanical energy release control including:

a comparison portion, operatively coupled to the electricity generating portion, comparing the supply voltage with a reference voltage;

a voltage boosting portion having at least a system boosting capacity and operatively coupled to an output terminal of the electricity generating portion and operative to boost an output voltage of the electricity generating portion and supply the boosted output voltage to the supply portion; and a control operation portion for performing at least one of a first control operation, in which a boost in the voltage boosted by the voltage boosting portion is decreased when the supply voltage becomes lower than the reference voltage, and a second control operation in which the boost in the voltage boosted by the voltage boosting portion is increased when the supply voltage becomes higher than the reference voltage.

2. The electricity generating device as claimed in claim 1, wherein the voltage boosting portion is coupled in parallel with the electricity generating portion.

3. The electricity generating device as claimed in claim 1, wherein said electricity generating portion includes a power spring capable for storing mechanical energy and a rotation member operatively coupled to the power spring, the release of energy from said power spring causing said rotation member to rotate.

4. The electricity generating device as claimed in claim 1, wherein the mechanical energy release control further comprises:

a power consuming portion operatively coupled in parallel to the electricity generating portion; and a second control operation portion for performing at least one of a first control operation, in which an amount of electric power consumed by the power consuming portion is decreased when the supply voltage becomes lower than the reference voltage, and a second control operation in which the amount of the electric power consumed by the power consuming portion is increased when the supply voltage becomes higher than the reference voltage.

5. An electricity generating device capable of storing mechanical energy, comprising:

an electricity generating portion capable of transforming mechanical energy into electric energy and outputting electric power;

a supply portion, operatively coupled to said electricity generating portion, outputting a supply voltage and supplying the electric power outputted from the electricity generating portion to an external circuit;

a mechanical energy release control, operatively coupled to the electricity generating portion, controlling the rate at which mechanical energy is converted to electrical energy by the electricity generating portion in accordance with the supply voltage supplied from the supply portion, said mechanical energy release control controlling the release of mechanical energy by controlling an output current of the electricity generating portion in accordance with the supply voltage supplied from the supply portion and a comparison portion, operatively coupled to the electricity generating portion, compares the reference voltage with a supply voltage;

a rectification portion, operatively coupled to the electricity generating portion, receiving a first d.c. output produced by the electricity generating portion and performing a half-wave rectification thereon; and a one-way element, operatively coupled to the electricity generating portion, permitting a second a.c. output to flow to the power consuming portion, the polarity of said second a.c. output being opposite to the polarity of the first mentioned a.c. output of the rectification portion.

6. An electricity generating device capable of storing mechanical energy, comprising:

an electricity generating portion capable of transforming mechanical energy into electric energy and outputting electric power;

a supply portion, operatively coupled to said electricity generating portion, outputting a supply voltage and supplying the electric power outputted from the electricity generating portion to an external circuit;

a mechanical energy release control, operatively coupled to the electricity generating portion, controlling the rate at which mechanical energy is converted to electrical energy by the electricity generating portion in accordance with the supply voltage supplied from the supply portion including a power spring capable for storing mechanical energy and a rotation member operatively coupled to the power spring, the release of energy from said power spring causing said rotation member to rotate, and said mechanical energy release control controlling the rotation of the rotation member by coming in physical contact therewith;

said mechanical energy release control including a first rotation control portion, operatively coupled to said electricity generating portion, mechanically controlling a rotating speed of the electricity generating portion in accordance with the supply voltage from the supply portion; and a second rotation control portion, operatively coupled to said electricity generating portion, electrically controlling an output current of the electricity generating portion in accordance with the supply voltage supplied from the supply portion.

7. The electricity generating device as claimed in claim 6, wherein the second rotation control portion is capable of boosting an output voltage of the electricity generating portion and supply the boosted output voltage to the supply portion and control a boosted amount of the output voltage based on the supply voltage.

8. The electricity generating device as claimed in claim 6, wherein the second rotation control portion includes a power consuming portion operatively coupled to said electricity generating portion and capable of controlling a load applied to the electricity generating portion based on the supply voltage.

9. An electricity generating device capable of storing mechanical energy, comprising:

an electricity generating portion capable of transforming mechanical energy into electric energy and outputting electric power including a power spring capable for storing mechanical energy and a rotation member operatively coupled to the power spring, the release of energy from said power spring causing said rotation member to rotate, and said mechanical energy release control controlling the rotation of the rotation member by coming in physical contact therewith;

a supply portion, operatively coupled to said electricity generating portion, outputting a supply voltage and supplying the electric power outputted from the electricity generating portion to an external circuit;

a mechanical energy release control, operatively coupled to the electricity generating portion, controlling the rate at which mechanical energy is converted to electrical energy by the electricity generating portion in accordance with the supply voltage supplied from the supply portion;

said mechanical energy release control including a first rotation control portion, operatively coupled to said electricity generating portion, boosting an output voltage of the electricity generating portion, supplying the boosted output voltage to said supply portion and controlling a boosted amount of the output voltage based on the supply voltage; and a second rotation control portion, operatively coupled to said electricity generating portion, including a power consuming portion operatively coupled to the electricity generating portion, controlling a load applied to the electricity generating portion based on the supply voltage.

10. An electricity generating device capable of storing mechanical energy, comprising:

an electricity generating portion capable of transforming mechanical energy into electric energy and outputting electric power and including a power spring capable for storing mechanical energy and a rotation member operatively coupled to the power spring, the release of energy from said power spring causing said rotation member to rotate, and said mechanical energy release control controlling the rotation of the rotation member by coming in physical contact therewith;

a supply portion, operatively coupled to said electricity generating portion, outputting a supply voltage and supplying the electric power outputted from the electricity generating portion to an external circuit;

a mechanical energy release control, operatively coupled to the electricity generating portion, controlling the rate at which mechanical energy is converted to electrical energy by the electricity generating portion in accordance with the supply voltage supplied from the supply portion;

the mechanical energy release control including a first rotation control portion, operatively coupled to the electricity generating portion, mechanically controlling a rotating speed of the electricity generating portion in accordance with the supply voltage supplied from the supply portion;

a second rotation control portion, operatively coupled to the electricity generating portion, boosting an output voltage of the electricity generating portion, supplying the boosted output voltage to the supply portion and controlling a boosted amount of the output voltage based on the supply voltage; and a third rotation control portion including a power consuming portion operatively coupled to the electricity generating portion, controlling a load applied to the electricity generating portion based on the supply voltage.

11. A method for controlling an electricity generating device including an electricity generating portion capable of generating electricity by using mechanical energy stored in a power spring and outputting electric power, a supply portion, operatively coupled to said electricity generating portion, and supplying the electric power outputted from the electricity generating portion to an external circuit and outputting a supply voltage, a voltage boosting portion, operatively coupled to said electricity generating portion, changing at least a system boosting capacity, boosting an output voltage of the electricity generating portion and supplying the boosted voltage to the supply portion, the method comprising the steps of:

comparing the supply voltage outputted by the supply portion with at least a reference voltage; and increasing a boost in the voltage which is boosted by the voltage boosting portion when the supply voltage is higher than the reference voltage and decreasing the boost in the voltage when the supply voltage is lower than the reference voltage.

12. A control method for controlling an electricity generating device including an electricity generating portion generating electricity by using mechanical energy stored in a power spring and outputting electric power, a supply portion, operatively coupled to the electricity generating portion, and supplying the electric power outputted by the electricity generating portion to an external circuit and outputting a supply voltage, a voltage boosting portion, operatively coupled to the electricity generating portion, and changing at least a system boosting capacity, boosting an output voltage of the electricity generating portion and supplying the boosted voltage to the supply portion, and a power consuming portion operatively coupled to the electricity generating portion and adapted to change the power consumption thereof, the method comprising:

comparing the supply voltage supplied from the supply portion with at least a reference voltage;

increasing the power consumption of the power consuming portion when the supply voltage is higher than the reference voltage, and decreasing the power consumption thereof when the supply voltage is lower than the reference voltage; determining whether further control is needed;

determining whether further control is needed; and increasing a boost in the voltage which is boosted by the voltage boosting portion when the supply voltage is higher than the reference voltage, and decreasing the boost in the voltage when the supply voltage is lower than the reference voltage, so that the step of increasing the power consumption of the power consuming portion is performed preferentially over the step of increasing a boost in the voltage which is boosted by the voltage boosting portion if further control is needed.

* * * * *